United States Patent
Kasuya et al.

(10) Patent No.: US 8,678,115 B2
(45) Date of Patent: Mar. 25, 2014

(54) VEHICLE DRIVE DEVICE

(75) Inventors: Satoru Kasuya, Nishio (JP); Masashi Kitou, Anjo (JP); Yuichi Seki, Okazaki (JP); Yusuke Takahashi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 47 days.

(21) Appl. No.: 13/186,994

(22) Filed: Jul. 20, 2011

(65) Prior Publication Data
US 2012/0032544 A1   Feb. 9, 2012

(30) Foreign Application Priority Data

Aug. 6, 2010   (JP) ................................. 2010-177818

(51) Int. Cl.
*B60K 1/00*   (2006.01)

(52) U.S. Cl.
USPC ........................... 180/65.1; 310/40 R; 310/61

(58) Field of Classification Search
USPC ................ 180/65.1; 310/40 R, 58, 59, 61, 54
See application file for complete search history.

(56) References Cited

U.S. PATENT DOCUMENTS

| | | | | |
|---|---|---|---|---|
| 4,311,932 | A * | 1/1982 | Olson .............................. | 310/61 |
| 7,679,238 | B2 * | 3/2010 | Nomura et al. ................. | 310/78 |
| 8,169,110 | B2 * | 5/2012 | Swales et al. .................... | 310/54 |
| 2005/0035675 | A1 * | 2/2005 | Yamaguchi et al. ......... | 310/68 R |
| 2006/0261701 | A1 * | 11/2006 | Camwell et al. .............. | 310/239 |
| 2007/0108857 | A1 * | 5/2007 | Nomura et al. ................. | 310/78 |
| 2009/0054190 | A1 | 2/2009 | Kim et al. | |
| 2009/0100965 | A1 | 4/2009 | Sanji et al. | |
| 2009/0121562 | A1 * | 5/2009 | Yim ................................. | 310/54 |
| 2009/0184592 | A1 * | 7/2009 | Sano et al. ...................... | 310/59 |
| 2010/0105519 | A1 | 4/2010 | Kasuya et al. | |
| 2010/0109461 | A1 | 5/2010 | Kato et al. | |
| 2011/0285387 | A1 * | 11/2011 | Andrae et al. ........... | 324/207.25 |

FOREIGN PATENT DOCUMENTS

| | | |
|---|---|---|
| JP | A-2007-107689 | 4/2007 |
| JP | A-2009-001127 | 1/2009 |
| JP | A-2009-051484 | 3/2009 |
| JP | A-2009-072052 | 4/2009 |
| JP | A-2009-101730 | 5/2009 |

(Continued)

OTHER PUBLICATIONS

Nov. 15, 2011 Search Report issued in PCT/JP2011/067707 (with translation).

(Continued)

*Primary Examiner* — J. Allen Shriver, II
*Assistant Examiner* — Steve Clemmons
(74) *Attorney, Agent, or Firm* — Oliff PLC

(57) ABSTRACT

In a rotating electrical machine configured with a rotor and stator, a lubricant supply portion is configured to supply a lubricant from within. A communication passage is provided in either the rotor support member or the sensor rotor, and is configured so as to provide a passage from a first space, which extends radially outward from the axial first direction side of the sensor rotor and is formed between the support wall and the rotor support member, with a second space, which is formed between the sensor rotor and the rotor support member. The case of the machine has a support wall extending at least in a radial direction to an axial first direction side, which is one side in an axial direction of the rotating electrical machine, and after lubricating the bearing, the lubricant is discharged from the second space to the first space through the communication passage.

12 Claims, 6 Drawing Sheets

(56) References Cited

FOREIGN PATENT DOCUMENTS

| | | |
|---|---|---|
| JP | A-2009-208702 | 9/2009 |
| JP | A-2009-303367 | 12/2009 |
| JP | A-2010-060026 | 3/2010 |
| JP | A-2010-105450 | 5/2010 |
| JP | A-2010-105615 | 5/2010 |
| WO | WO 2005/105507 A1 | 11/2005 |
| WO | WO 2010/050345 A1 | 5/2010 |

OTHER PUBLICATIONS

Aug. 16, 2011 International Search Report issued in PCT/JP2011/065371 (with translation).

\* cited by examiner

F I G . 3
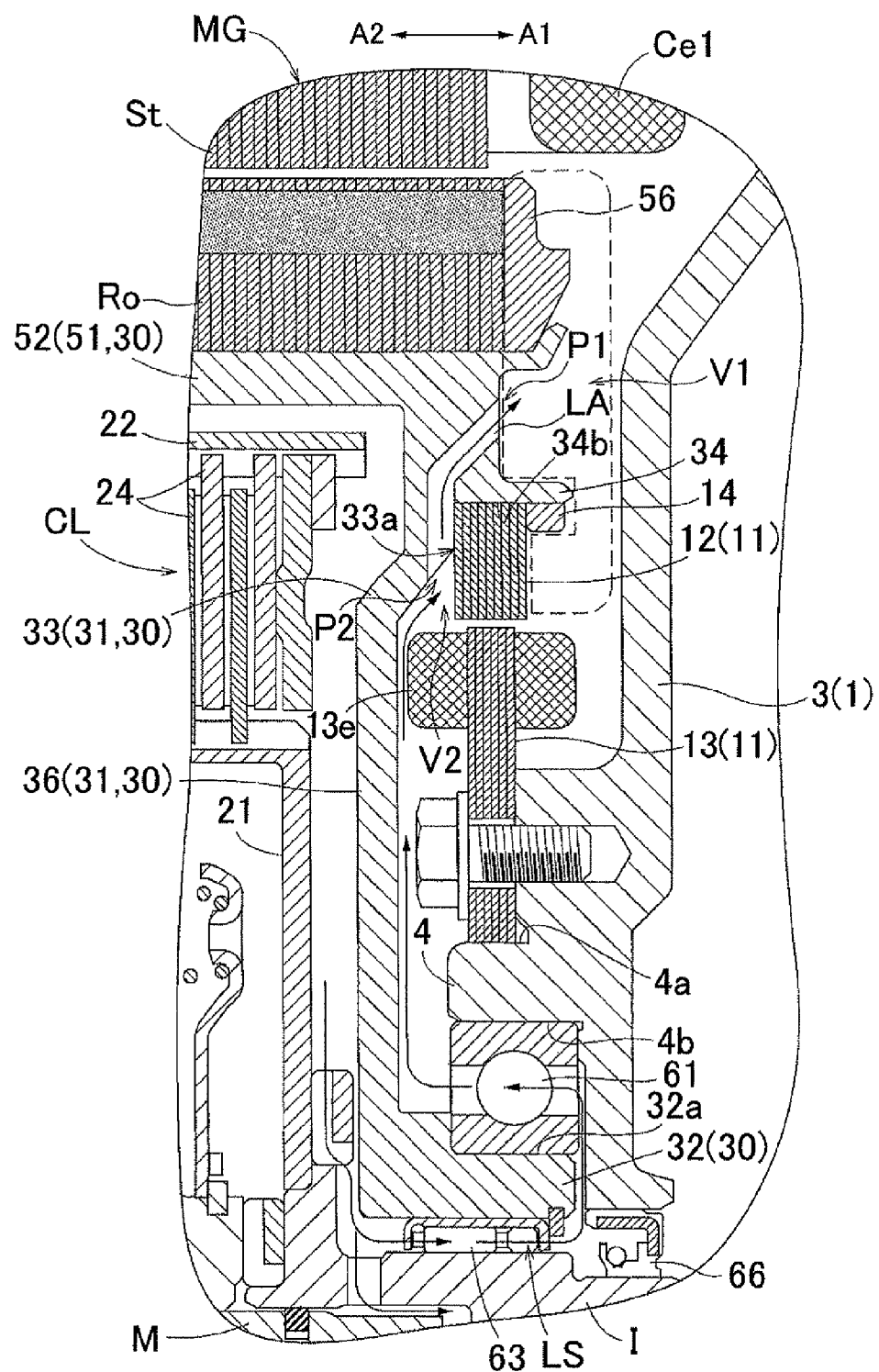

VEHICLE DRIVE DEVICE

INCORPORATION BY REFERENCE

The disclosure of Japanese Patent Application No. 2010-177818 filed on Aug. 6, 2010 including the specification, drawings and abstract is incorporated herein by reference in its entirety.

BACKGROUND OF THE INVENTION

The present invention relates to a vehicle drive device that includes a rotating electrical machine accommodated in a case, with the rotating electrical machine having a rotor and a stator and functioning as a driving force source of a vehicle.

Description of the Related Art

Various structures are conventionally known as a vehicle drive device that includes a rotating electrical machine accommodated in a case with the rotating electrical machine having a rotor and a stator and functioning as a driving force source of a vehicle. In a vehicle drive device described in WO2005/105507 below, a case (a motor housing 4) has a support wall (a partition wall member 50) extending in a radial direction on an axial first direction side of a rotating electrical machine (a motor-generator 2), and the vehicle drive device includes a rotor support member (a rotor support plate 41 and a front cover 24) that rotatably supports a rotor (40), a bearing (a bearing 55) placed between the support wall and the rotor support member, and a rotation sensor (a resolver 75) placed radially outside the bearing. In this vehicle drive device, a sensor stator (a stator 75b) of the rotation sensor is fixed to the support wall radially outside the bearing, and a sensor rotor (a rotor plate 75a) thereof is fixed to the rotor support member radially outside the sensor stator. Note that a lubricating structure for the bearing is not mentioned in the vehicle drive device of WO2005/105507.

On the other hand, a vehicle drive device described in Japanese Patent Application Publication No. JP-A-2009-101730 below includes a friction engagement device (a clutch C). A housing that surrounds the friction engagement device is formed by using a part of a rotor support member (RS) that rotatably supports a rotor (m1), and a lubricant such as oil, which is supplied into the housing and leaks from the housing, is supplied from radially inside to a bearing that is placed between a support wall (a partition wall SW) and the rotor support member. In this manner, a lubricating structure for the bearing is simplified, and the size of the vehicle drive device is reduced. Note that in the vehicle drive device described in Japanese Patent Application Publication Na JP-A-2009-101730, a sensor rotor (a resolver rotor Rr) of a rotation sensor is fixed to the rotor support member radially outside the bearing, and a sensor stator (a resolver stator Rs) thereof is fixed to the support wall radially outside the sensor rotor. After lubricating the bearing, the lubricant flows radially outward and is accumulated between the sensor stator and the support wall. The oil thus accumulated further flows radially outward after flowing between the sensor rotor and the sensor stator.

In the structure of the vehicle drive device of WO2005/105507 described above, it is possible to use the structure as described in Japanese Patent Application Publication No. JP-A-2009-101730 in which the lubricant, which is supplied into the housing surrounding the friction engagement device and leaks from the housing, is supplied to the bearing from radially inside. In this case, however, the lubricant flows radially outward after lubricating the bearing, and is accumulated between the sensor rotor and the rotor support member. The lubricant thus accumulated can serve as drag resistance to rotation of the sensor rotor. This can reduce the overall energy efficiency of the vehicle drive device.

SUMMARY OF THE INVENTION

It is therefore desired to implement a vehicle drive device capable of lubricating a bearing with a simple structure, and capable of reducing drag loss of a sensor rotor due to a lubricant that has lubricated the bearing.

A vehicle drive device according to a first aspect of the present invention includes: a rotating electrical machine that is accommodated in a case, and has a rotor and a stator and functions as a driving source force of a vehicle; a rotor support member that rotatably supports the rotor placed radially inside the stator; a bearing that is placed between the support wall and the rotor support member; a lubricant supply portion that supplies a lubricant to the bearing from radially inside; a rotation sensor having a sensor stator that is fixed to the support wall radially outside the bearing, and a sensor rotor that is placed radially outside the sensor stator and is fixed to a sensor rotor attachment portion formed so as to protrude from a side face of the rotor support member on the axial first direction side; and a communication passage that is provided in at least one of the rotor support member and the sensor rotor, and communicates a first space, which extends radially outward from the axial first direction side of the sensor rotor and is formed between the support wall and the rotor support member, with a second space, which is formed between the sensor rotor and the rotor support member. In the vehicle drive device, the case has a support wall extending at least in a radial direction to an axial first direction side, which is one side in an axial direction of the rotating electrical machine, and after lubricating the bearing, the lubricant is discharged from the second space to the first space through the communication passage.

Note that the "rotating electrical machine" is used as a concept including a motor (an electric motor), a generator (an electric generator), and a motor-generator that functions both as the motor and the generator as necessary.

According to the first aspect, the bearing placed between the support wall and the rotor support member can be lubricated in a simple manner by the lubricant that is supplied from radially inside from the lubricant supply portion.

In this aspect, at least one of the rotor support member and the sensor rotor is provided with the communication passage that communicates the first space extending radially outward from the axial first direction side of the sensor rotor and formed between the support wall and the rotor support member, with the second space formed between the sensor rotor and the rotor support member. Thus, the lubricant that flows radially outward after lubricating the bearing is smoothly discharged from the second space between the sensor rotor and the rotor support member into the first space between the support wall and the rotor support member through the communication passage. This reduces accumulation of the lubricant between the sensor rotor and the rotor support member, whereby drag loss of the sensor rotor due to the accumulated lubricant can be reduced.

Thus, according to the first aspect, the vehicle drive device can be implemented which is capable of lubricating the bearing by a simple structure, and capable of reducing drag loss of the sensor rotor due to the lubricant that has lubricated the bearing.

According to a second aspect of the present invention, the rotor support member may have a separated portion formed so as to be separated from a side face of the sensor rotor on an axial second direction side, which is the other side in the axial direction of the rotation electrical machine, to the axial second direction side, in such a manner to become more separated toward a radially inner side, and the communication passage may be formed so as to open to the second space formed in a groove shape between a side face of the separated portion on the axial first direction side and the side face of the sensor rotor on the axial second direction side.

In the case of using the rotation sensor, a part of the sensor rotor and the sensor rotor often need to be separated from the rotor support member generally in order to ensure capability of the rotation sensor, to avoid shape limitations, or the like. Thus, in many cases, the second space in the groove shape is formed between the side face of the separated portion of the rotor support member on the axial first direction side and the side face of the sensor rotor on the axial second direction side. In the case where such a second space in the groove shape is formed, the lubricant especially tends to be accumulated in the second space after lubricating the bearing.

In the second aspect, however, the communication passage is provided, whereby the lubricant that is accumulated in the second space can be smoothly discharged to the first space. Thus, drag loss of the sensor rotor can be effectively reduced.

According to a third aspect of the present invention, a part of the opening of the communication passage to the second space may be formed by a part of the side face of the separated portion on the axial first direction side which contacts the sensor rotor, or by a part of the side face of the sensor rotor on the axial second direction side which contacts the separated portion.

According to the third aspect, the communication passage is formed so as to open at a position including the contact portion between the separated portion and the sensor rotor in the second space, and opens to a radially outer end of the second space. Thus, almost all of the lubricant that is accumulated in the second space can be smoothly discharged to the first space by a centrifugal force associated with rotation of the rotor support member. Thus, drag loss of the sensor rotor can be effectively reduced.

According to a fourth aspect of the present invention, the communication passage may open in the radial direction or in the axial direction in the second space.

According to the fourth aspect, the lubricant can be appropriately discharged radially outward or toward the axial first direction side from the second space by the centrifugal force associated with rotation of the rotor support member.

According to a fifth aspect of the present invention, the communication passage may be formed to extend at least in the radial direction and the axial direction inside the rotor support portion, and open to the first space in the side face of the rotor support member on the axial first direction side.

According to the fifth aspect, the communication passage that communicates the first space with the second space can be appropriately formed inside the rotor support member. Moreover, in this aspect, the communication passage can be formed inside the rotor support member without the need to process the sensor rotor. Thus, the communication passage can be provided while suppressing reduction in detection accuracy of the rotation sensor.

According to a sixth aspect of the present invention, the communication passage may be formed to extend through the sensor rotor in the axial direction, and open to the first space in a side face of the sensor rotor on the axial first direction side.

According to the sixth aspect, the communication passage that communicates the first space with the second space can be appropriately formed inside the sensor rotor. Moreover, in this aspect, the communication passage can be easily formed by merely extending the communication passage through the sensor rotor in the axial direction.

According to a seventh aspect of the present invention, the rotor support member may have a cylindrical inner support portion that supports the rotor from radially inside, an axial groove portion may be formed which extends in the axial direction along a joint surface between an inner peripheral surface of the rotor and an outer peripheral surface of the inner support portion, and open to a side face of the rotor on the axial first direction side, and the communication passage may be formed so as to extend inside the rotor support member at least in the radial direction to communicate with the axial groove portion, and so as to open to the first space in the side face of the rotor on the axial first direction side via the axial groove portion.

According to the seventh aspect, the communication passage that communicates the first space with the second space can be appropriately formed inside the rotor support member and between the inner support portion of the rotor support member and the rotor. In this aspect, the axial groove portion can be easily formed by simple processing of one or both of the inner peripheral surface of the rotor and the outer peripheral surface of the inner support portion. Moreover, the communication passage is structured so as to extend at least in the radial direction inside the rotor support member to communicate with the axial groove portion, whereby the entire communication passage can also be easily formed. In this aspect, the communication passage can be formed inside the rotor support member and between the inner support portion of the rotor support member and the rotor without the need to process the sensor rotor. Thus, the communication passage can be provided while suppressing reduction in detection accuracy of the rotation sensor.

According to an eighth aspect of the present invention, the rotation sensor may be positioned radially inside the rotor so as to overlap the rotor as viewed in the radial direction, and an opening on the first space side may be positioned radially inside a coil end portion of the stator so as to overlap the coil end portion as viewed in the radial direction.

Note that regarding arrangement of two members, the expression "to overlap as viewed in a certain direction" indicates that, when the certain direction serves as a viewing direction and a viewing point is moved in each direction perpendicular to the viewing direction, the viewing point from which the two members are seen to overlap each other is present at least in some region.

According to the eighth aspect, the axial length of the space that is occupied by the rotation sensor and the rotor of the rotating electrical machine is reduced by the amount by which the rotation sensor and the rotor of the rotating electrical machine overlap each other as viewed in the radial direction, whereby the overall size of the device can be reduced. Moreover, since the opening on the first space side is positioned so as to overlap the coil end portion of the stator as viewed in the radial direction, the coil end portion can be cooled by the lubricant that is discharged from the opening on the first space side through the communication passage.

According to a ninth aspect of the present invention, a guide portion that guides the lubricant from the communication passage to the coil end portion of the stator may be provided in a portion radially outside an opening on the first space side that is formed in the rotor support member or the sensor rotor.

According to the ninth aspect, the lubricant that is discharged from the opening on the first space side that is formed in the rotor support member or the sensor rotor can be appropriately supplied to the coil end portion. Thus, the coil end portion can be effectively cooled.

According to a tenth aspect of the present invention, the vehicle drive device further include: a first axially protruding portion that protrudes from the support wall to the axial second direction side, which is the other side in the axial direction of the rotating electrical machine; a radially extending portion that forms a part of the rotor support member and extends at least in the radial direction; a second axially protruding portion that protrudes from the radially extending portion to the axial first direction side; and a third axially protruding portion that is positioned radially outside the second axially protruding portion and protrudes from the radially extending portion to the axial first direction side, the bearing be placed in contact with an inner peripheral surface of the first axially protruding portion and an outer peripheral surface of the second axially protruding portion, and the sensor stator be placed in contact with an outer peripheral surface of the first axially protruding portion, and the sensor rotor be placed in contact with an inner peripheral surface of the third axially protruding portion.

According to the tenth aspect, the structure in which the sensor stator is positioned radially outside the bearing, and the sensor rotor is placed radially outside the sensor stator can be appropriately implemented. In this aspect, since the bearing and the rotation sensor can be positioned so as to overlap each other as viewed in the radial direction, the axial length of the space that is occupied by the bearing and the rotation sensor can be reduced, whereby the overall size of the device can be reduced. Moreover, since the sensor stator and the sensor rotor are placed in contact with the outer peripheral surface of the first axially protruding portion and the inner peripheral surface of the third axially protruding Portion, respectively, the sensor stator and the sensor rotor can be directly supported by the support wall and the rotor support member, respectively, whereby high detection accuracy of the rotation sensor can be maintained.

According to an eleventh aspect of the present invention, the vehicle drive device may further include: a shaft member that extends, from the axial first direction side, through the support wall and the rotor support member radially inside thereof so that the shaft member is inserted into the rotor support member; and a friction engagement device that is positioned radially inside the rotor, a housing that surrounds the friction engagement device may be formed by using at least a part of the rotor support member, and the friction engagement device may be placed inside the housing in a fluid-tight state, the housing may be filled with the lubricant, and the lubricant that flows and leaks from between the rotor support member and the shaft member may be supplied to the bearing as the lubricant from the lubricant supply portion.

In general, a fluid (e.g., oil) that is used as a lubricant can function as a coolant. According to the eleventh aspect, the friction engagement device is placed inside the housing that is formed by using at least the part of the rotor support member, and the housing is filled with the lubricant. Thus, the friction engagement device can also be efficiently cooled by the lubricant.

Moreover, in this aspect, the lubricant, which flows and leaks from between the rotor support member and the shaft member that extends through the support wall and the rotor support member radially inside thereof so that the shaft member is inserted into the rotor support member can be used as a lubricant for lubricating the bearing. Thus, the lubricating structure for the bearing can be simplified, and the size of the vehicle drive device can be reduced.

BRIEF DESCRIPTION OF THE DRAWINGS

FIG. 3 is a cross-sectional view of a main portion of the hybrid drive device according to the first embodiment;

DETAILED DESCRIPTION OF THE EMBODIMENTS

1. First Embodiment

Figure 1:
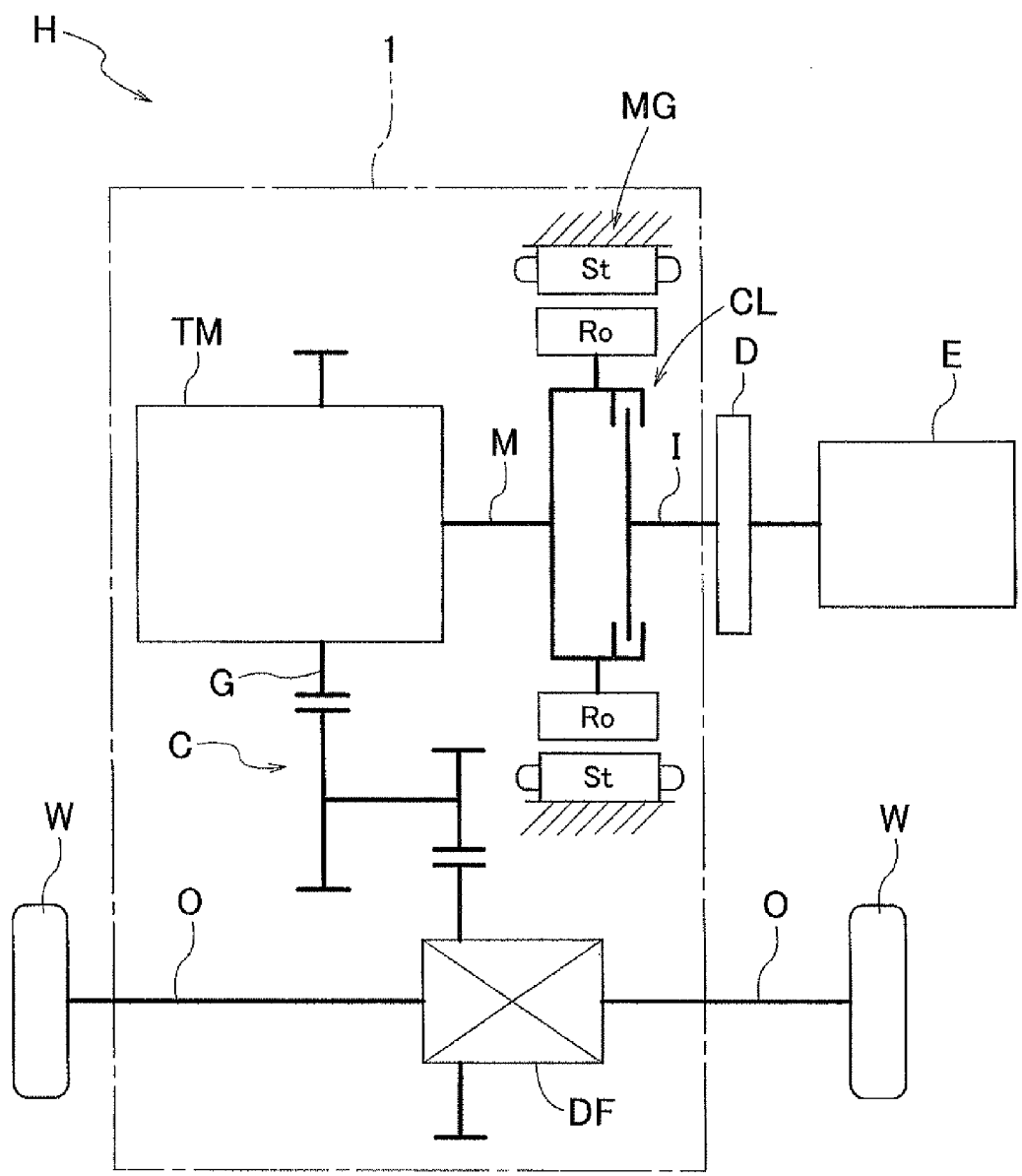
FIG. 1 is a schematic diagram showing a schematic structure of a hybrid drive device according to a first embodiment.

A first embodiment of the present invention will be described with reference to the accompanying drawings. The present embodiment is described with respect to an example in which a vehicle drive device of the present invention is applied to a hybrid drive device. FIG. 1 is a schematic diagram showing a schematic structure of a hybrid drive device H according to the present embodiment. The hybrid drive device H is a drive device for hybrid vehicles, which uses one or both of an internal combustion engine E and a rotating electrical machine MG as a driving force source of the vehicle. The hybrid drive device H is structured as a so-called one-motor parallel type hybrid drive device. The hybrid drive device H according to the present embodiment will be described in detail below.

1. Overall Structure of Hybrid Drive Device

First, the overall structure of the hybrid drive device H of the embodiment will be described below. As shown in FIG. 1, the hybrid drive device H includes: an input shaft I that is drivingly coupled to the internal combustion engine E as a first driving force source of the vehicle; the rotating electrical machine MG as a second driving force source of the vehicle; a speed change mechanism TM; an intermediate shaft M that is drivingly coupled to the rotating electrical machine MG and is drivingly coupled to a speed change mechanism TM; and an output shaft O that is drivingly coupled to wheels W. The hybrid drive device H further includes; a clutch CL provided so as to be able to switch between transmission and interruption of a driving force between the input shaft I and the intermediate shaft M; a counter gear mechanism C; and an output differential gear unit DF. These structures are accommodated in a case (a drive device case) 1.

Note that as used herein, the expression "drivingly coupled" refers to the state in which two rotating elements are coupled together so as to be able to transmit a driving force therebetween, and is used as a concept including the state in which the two rotating elements are coupled together so as to rotate together, or the state in which the two rotating elements are coupled together so as to be able to transmit a driving force therebetween via one or more transmission members. Such transmission members include various members that transmit rotation at the same speed or after changing the speed of the rotation, and for example, include a shaft, a gear mechanism, a belt, a chain, etc. The "driving force" is herein used as a synonym for torque. In the present embodiment, the "axial direction," the "radial direction," and the "circumferential direction" are defined based on a central axis of rotation of the input shaft I, the intermediate shaft M, and the rotating electrical machine MG, which are placed on the same axis.

The internal combustion engine E is a device that is driven by combustion of fuel inside the engine to output motive power. For example, various known engines such as a gasoline engine and a diesel engine can be used as the internal combustion engine E. In this example, an output rotating shaft such as a crankshaft of the internal combustion.engine E is drivingly coupled to the input shaft I via a damper D. The input shaft I is drivingly coupled to the rotating electrical machine MG and the intermediate shaft M via the clutch CL, and the input shaft I is selectively drivingly coupled to the rotating electrical machine MG and the intermediate shaft M by the clutch CL. When the clutch CL is in an engaged state, the internal combustion engine E is drivingly coupled to the rotating electrical machine MG via the input shaft I. When the clutch CL is in a disengaged state, the internal combustion engine E is separated from the rotating electrical machine MG.

The rotating electrical machine MG has a stator St and a rotor Ro, and is capable of functioning as a motor (an electric motor) that is supplied with electric power to generate motive power, and as a generator (an electric generator) that is supplied with motive power to generate electric power. Thus, the rotating electrical machine MG is electrically connected to an electricity storage device (not shown). In this example, a battery is used as the electricity storage device. Note that a capacitor, etc. may also be used as the electricity storage device. The rotating electrical machine MG is supplied with electric power from the battery to perform power running, or supplies output torque of the internal combustion engine E or electric power generated by an inertial force of the vehicle to the battery to accumulate the electric power therein. The rotor Ro of the rotating electrical machine MG is drivingly coupled to the intermediate shaft M so as to rotate together therewith. The intermediate shaft M is an input shaft (a speed change input shaft) of the speed change mechanism TM.

The speed change mechanism TM is a mechanism that changes the rotational speed of the intermediate shaft M at a predetermined speed ratio to transmit the resultant rotation to a speed change output gear G. In the present embodiment, an automatic stepped speed change mechanism, which is structured to include single-pinion type and Ravigneaux type planetary gear mechanisms and a plurality of engagement devices such as a clutch, a brake, and a one-way clutch, and which includes a plurality of shift speeds having different speed ratios and being switchable therebetween, is used as such a speed change mechanism TM. Note that an automatic stepped speed change mechanism having other specific structure, an automatic continuously variable speed change mechanism capable of continuously changing the speed ratio, a manual stepped speed change mechanism having a plurality of shift speeds having different speed ratios and being switchable therebetween, etc. may be used as the speed change mechanism TM. The speed change mechanism TM changes the rotational speed of the intermediate shaft M at a predetermined speed ratio at each time and converts the torque thereof to transmit the resultant rotation and torque to the speed change output gear G.

The speed change output gear G is drivingly coupled to the output differential gear unit DF via the counter gear mechanism C. The output differential gear unit DF is drivingly coupled to the wheels W via the output shaft O, and distributes and transmits rotation and torque, which are input to the output differential gear unit DF, to the two wheels W, namely the right and left wheels W. Thus, the hybrid drive device H can transmit the torque of one or both of the internal combustion engine E and the rotating electrical machine MG to the wheels W to cause the vehicle to move.

Note that the hybrid drive device H of the present embodiment has a multi-axis structure in which the input shaft I and the intermediate shaft M are placed on the same axis, and the output shaft O is placed on a different axis from that of the input shaft I and the intermediate shaft M so as to extend parallel to each other. Such a structure is suitable for the structure of the hybrid drive device H that is mounted on, e.g., front-engine, front-wheel drive (FF) vehicles.

1-2. Structure of Each Portion of Hybrid Drive Device

Figure 2:
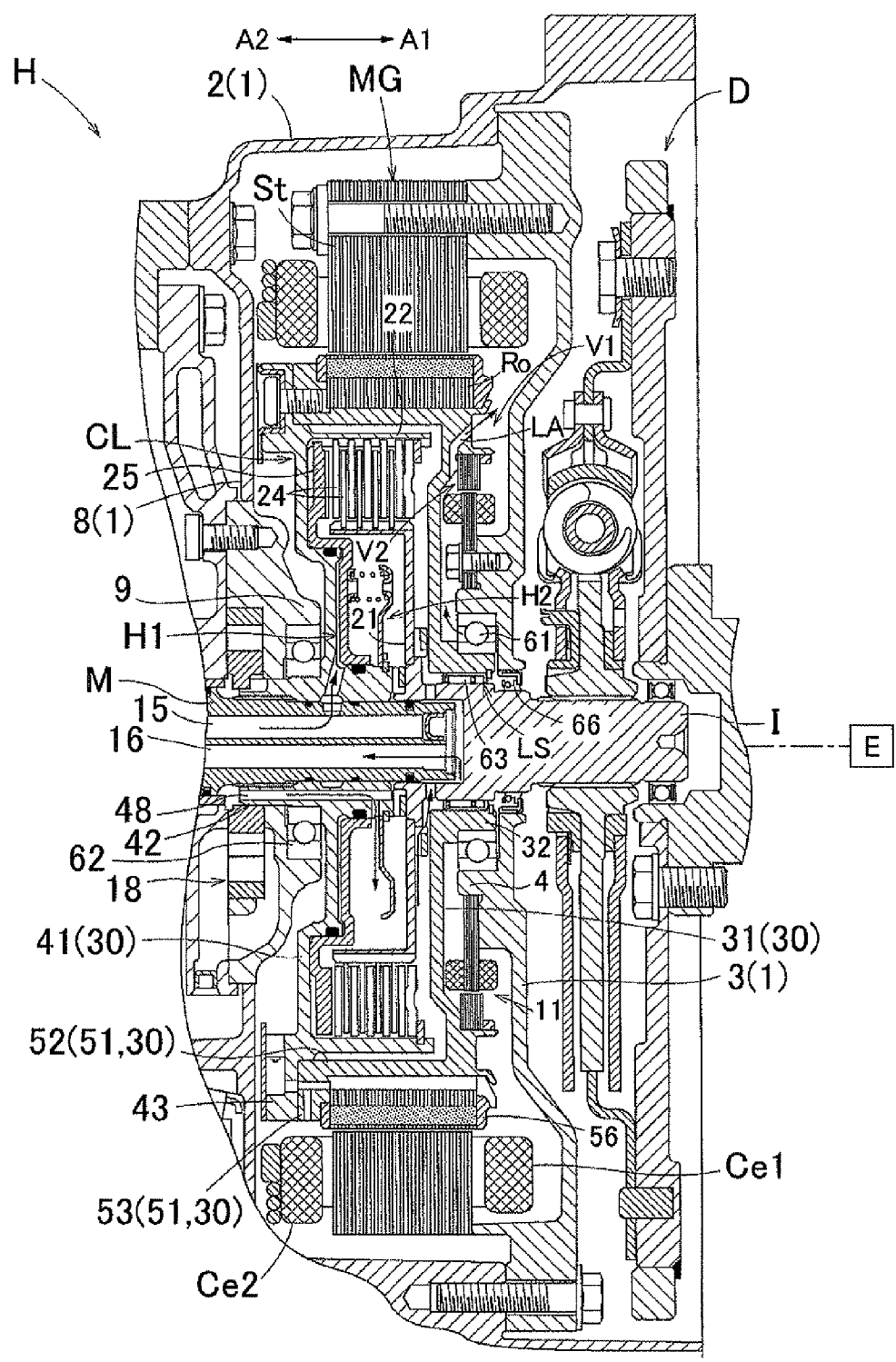
FIG. 2 is a partial cross-sectional view of the hybrid drive device according to the first embodiment.

The structure of each portion of the hybrid drive device H according to the present embodiment will be described below. As shown in FIG. 2, the case 1 contains at least the rotating electrical machine MG and the clutch CL. The case 1 includes: a case peripheral wall 2 that covers the outer peripheries of the components contained in the case 1 such as the rotating electrical machine MG and the speed change mechanism TM; a first support wall 3 that closes an opening of the case peripheral wall 2 on an axial first direction A1 side (the internal combustion engine E side, the right side in FIG. 2; the same applies to the following description); and a second support wall 8 that is placed between the rotating electrical machine MG and the speed change mechanism TM in the axial direction on an axial second direction A2 side (on the opposite side from the internal combustion engine E, the left side in FIG. 2; the same applies to the following description) with respect to the first support wall 3. Although not shown in the drawing, the case 1 further includes an end support wall that closes an end of the case peripheral wall 2 located on the axial second direction A2 side.

The first support wall 3 is shaped so as to extend at least in the radial direction, and in the present embodiment, extends in the radial and circumferential directions. A through hole in the axial direction is formed in the first support wall 3, and the input shaft I, which is inserted through the through hole, is inserted into the case 1 through the first support wall 3. The first support wall 3 is coupled to a cylindrical (boss-shaped) axial protruding portion 4 that protrudes to the axial second direction A2 side. The axial protruding portion 4 is integrally coupled to the first support wall 3. The first support wall 3 is placed on the axial first direction A1 side with respect to the rotating electrical machine MG and the clutch CL, and more specifically, is placed adjacent to a rotor support member 30, which supports the rotor Ro of the rotating electrical machine MG, on the axial first direction A1 side with a predetermined gap between the first support wall 3 and the rotor support member 30. The first support wall 3 rotatably supports the rotor support member 30 on the axial first direction A1 side of the rotating electrical machine MG. In the present embodiment, the first support wall 3 corresponds to a "support wall" in the present invention, and the axially protruding portion 4 corresponds to a "first axially protruding portion" in the present invention.

The second support wall 8 is shaped so as to extend at least in the radial direction, and in the present embodiment, extends in the radial and circumferential directions. A through hole in the axial direction is formed in the second support wall 8, and the intermediate shaft M, which is inserted through the through hole, extends through the second support wall 8. The second support wall 8 is coupled to a boss-shaped cylindrical (boss-shaped) axial protruding portion 9 that protrudes to the axial first direction A1 side. The axial protruding portion 9 is integrally coupled to the second support wall 8. The second support wall 8 is placed on the axial second direction A2 side with respect to the rotating electrical machine MG and the clutch CL, and more specifically, is placed adjacent to the rotor support member 30 on the axial second first direction A2 side with a predetermined gap between the second support wall 8 and the rotor support member 30. The second support wall 8 rotatably supports the rotor support member 30 on the axial second direction A2 side of the rotating electrical machine MG.

An oil pump 18 is accommodated in a pump chamber that is formed inside the second support wall 8. In the present embodiment, the oil pump 18 is an internal gear pump having an inner rotor and an outer rotor. The inner rotor of the oil pump 18 is spline coupled, in its radial center, to the rotor support member 30 so as to rotate together therewith. The oil pump 18 sucks oil from an oil pan (not shown) according to rotation of the rotor support member 30, and discharges the sucked oil to supply the oil to the clutch CL, the speed change mechanism TM, the rotating electrical mechanism MG, etc. Note that oil passages are formed inside the second support wall 8, the intermediate shaft M, etc., and the oil discharged from the oil pump 18 is supplied via a hydraulic control device, not shown, and the oil passages to each portion that is to be supplied with the oil. In the present embodiment, a part of the oil in the pump chamber may leak little by little in the axial direction through a gap between the through hole in the second support wall 8 and the rotor support member 30, and may be supplied to the rotating electrical machine MG. The oil thus supplied to each portion either lubricates or cools the portion, or both lubricates and cools the portion. The oil in the present embodiment functions as a "lubricating coolant" that can function both as a "lubricant" and a "coolant."

The input shaft I is a shaft member for inputting torque of the internal combustion engine E to the hybrid drive device H. The input shaft I is drivingly coupled to the internal combustion engine E at its end located on the axial first direction A1 side. The input shaft I is provided so as to extend through the first support wall 3, and as shown in FIG. 2, is drivingly coupled to the output rotating shaft of the internal combustion engine E via the damper D on the axial first direction A1 side of the first support wall 3, so as to rotate together with the output rotating shaft. A seal member 66 is provided in a region between the outer peripheral surface of the input shaft I and the inner peripheral surface of the through hole provided in the first support wall 3, in order to provide a fluid-tight seal therebetween to suppress oil leakage toward the axial first direction A1 side (the damper D side). In the present embodiment, the input shaft I corresponds to a "shaft member" in the present invention.

In the present embodiment, a hole, which extends in the axial direction, is formed in the radial center of an end of the input shaft I located on the axial second direction A2 side. Of the intermediate shaft M placed on the same axis as the input shaft I, an end located on the axial first direction A1 side is inserted in the axial direction into the hole. The end of the input shaft I located on the axial second direction A2 side is coupled to a clutch hub 21 extending radially outward. In the present embodiment, the rotor support member 30 is formed so as to cover the periphery of the clutch CL as described below, and a housing (a clutch housing) that accommodates the clutch CL is formed by the rotor support member 30. In this example, the housing (the clutch housing) is formed by using the entire rotor support member 30. When the term "rotor support member 30" is used in the following description, the term includes the meaning of the "housing (the clutch housing)".

The intermediate shaft M is a shaft member for inputting one or both of the torque of the rotating electrical machine MG and the torque of the internal combustion engine E via the clutch CL to the speed change mechanism TM. The intermediate shaft M is spline coupled to the rotor support member 30. As shown in FIG. 2, the intermediate shaft M is provided so as to extend through the second support wall 8. As described above, a through hole in the axial direction is formed in the radial center of the second support wall 8, and the intermediate shaft M extends through the second support wall 8 via the through hole. The intermediate shaft M is supported in the radial direction so as to be rotatable with respect to the second support wall 8. In the present embodiment, the intermediate shaft M has a plurality of oil passages therein, including a supply oil passage 15 and a discharge oil passage 16, The supply oil passage 15 extends in the axial direction, and also extends in the radial direction at a predetermined position in the axial direction so as to communicate with a hydraulic oil chamber H1 of the clutch CL, and opens in the outer peripheral surface of the intermediate shaft M. The discharge oil passage 16 extends in the axial direction, and opens in an end face of the intermediate shaft M located on the axial first direction A1 side.

The clutch CL is a friction engagement device, which is provided so as to be able to switch between transmission and interruption of the driving force between the input shaft I and the intermediate shaft M as described above, and which selectively drivingly couples the internal combustion engine E to the rotating electrical machine MG. In the present embodiment, the clutch CL is structured as a wet multi-disc clutch mechanism. As shown in FIGS. 2 and 3, the clutch CL includes the clutch hub 21, a clutch drum 22, a plurality of friction plates 24, and a piston 25. The clutch hub 21 is coupled to the end of the input shaft I on the axial second direction A2 side so as to rotate together with the input shaft I. The clutch drum 22 is formed integrally with the rotor support member 30, and is coupled to the intermediate shaft M via the rotor support member 30 so as to rotate together with the intermediate shaft M. The friction plates 24 are provided between the clutch hub 21 and the clutch drum 22, and have hub-side friction plates and drum-side friction plates in pairs.

In the present embodiment, the hydraulic oil chamber H1 in a fluid tight state is formed between the rotor support member 30 formed integrally with the clutch drum 22 and the piston 25. Pressure oil discharged from the oil pump 18 and adjusted to a predetermined oil pressure by the hydraulic control device (not shown) is supplied to the hydraulic oil chamber H1 through the supply oil passage 15 formed in the intermediate shaft M. Engagement and disengagement of the clutch CL are controlled according to the oil pressure supplied to the hydraulic oil chamber H1. A circulating oil chamber H2 is formed on the opposite side of the piston 25 from the hydraulic oil chamber H1. The pressure oil discharged from the oil pump 18 and adjusted to a predetermined oil pressure by the hydraulic control device (not shown) is supplied to the circulating oil chamber H2 through a circulating oil passage 48 formed in the rotor support member 30.

As shown in FIG. 2, the rotating electrical machine MG is placed radially outside the clutch CL. The rotating electrical machine MG and the clutch CL are positioned so as to have a portion overlapping each other as viewed in the radial direction. Arranging the rotating electrical machine MG and the clutch CL in such a positional relation reduces the length in the axial direction, whereby the overall size of the device is reduced.

The rotating electrical machine MG has the stator St fixed to the case 1, and the rotor Ro rotatably supported radially inside the stator St via the rotor support member 30. The stator St and the rotor Ro are placed so as to face each other in the radial direction with a small gap therebetween. The stator St includes a stator core, which is formed as a stacked structure formed by stacking a plurality of annular disc-shaped electromagnetic steel plates and which is fixed to the first support wall 3, and a coil that is wounded around the stator core. Note that portions of the coil, which protrude in the axial direction from the end faces of the stator located on both sides in the axial direction, serve as coil end portions Ce1, Ce2. In this example, the coil end portion on the axial first direction A1 side is a first coil end portion Ce1, and the coil end portion on the axial second direction A2 side is a second coil end portion Ce2. The rotor Ro of the rotating electrical machine MG includes a rotor core formed as a stacked structure formed by stacking a plurality of annular disc-shaped electromagnetic steel plates, and permanent magnets embedded in the rotor core. In the present embodiment, the plurality of permanent magnets extending in the axial direction are arranged in the rotor Ro (the rotor core) so as to be distributed in the circumferential direction. In the present embodiment, the first coil end portion Ce1 corresponds to a "coil end portion" in the present invention.

As shown in FIGS. 2 and 3, the hybrid drive device H of the present embodiment includes the rotor support member 30 that supports the rotor Ro. The rotor support member 30 supports the rotor Ro so as to be rotatable with respect to the case 1. More specifically, the rotor support member 30 is supported by the first support wall 3 via a first bearing 61 on the axial first direction A1 side, and is supported by the second support wall 8 via a second bearing 62 on the axial second direction A2 side, with the rotor Ro fixed to the outer periphery of the rotor support member 30. The rotor support member 30 is formed so as to surround the clutch CL placed inside the rotor support member 30, that is, so as to cover the clutch CL on the axial first direction A1 side, on the axial second direction A2 side, and on the outer side in the radial direction. Thus, the rotor support member 30 has a first radially extending portion 31 placed on the axial first direction A1 side of the clutch CL and extending in the radial direction, a second radially extending portion 41 placed on the axial second direction A2 side of the clutch CL and extending in the radial direction, and an axially extending portion 51 placed radially outside the clutch CL and extending in the axial direction.

The first radially extending portion 31 is shaped to extend at least in the radial direction, and in the present embodiment, extends in the radial and circumferential directions. An axial through hole is formed in the radial center of the first radially extending portion 31, and the input shaft I inserted through this through hole extends through the first radially extending portion 31, and is inserted into the rotor support member 30. In this example, the first radially extending portion 31 is formed to have a plate shape as a whole, and is shaped so that a radially inner portion of the first radially extending portion 31 is slightly offset to the axial second direction A2 side with respect to a radially outer portion thereof. The first radially extending portion 31 is coupled to a cylindrical (boss-shaped) axially protruding portion 32 that protrudes toward the axial first direction A1 side. The first radially extending portion 31 is also coupled to a cylindrical (boss-shaped) second axially protruding portion 34 that is located radially outside the axially protruding portion 32 and protrudes toward the axial first direction A1 side. In the following description, in order to clearly distinguish these axially protruding portions from each other, the axially protruding portion 32 located at a radially inner position is referred to as the "inner axially protruding portion 32," and the axially protruding portion 34 located at a radially outer position is referred to as the "outer axially protruding portion 34." Note that in the present embodiment, the inner axially protruding portion 32 corresponds to a "second axially protruding portion" in the present invention, and the outer axially protruding portion 34 corresponds to a "third axially protruding portion" in the present invention.

The outer axially protruding portion 34 is integrally coupled to the first radially extending portion 31 at a position near a joint portion with the axially extending portion 51. The inner axially protruding portion 32 is integrally coupled to the first radially extending portion 31 at a radially inner end of the first radially extending portion 31. The inner axially protruding portion 32 is formed so as to surround the input shaft I. A third bearing 63 is provided between the inner axially protruding portion 32 and the input shaft I. In this example, the third bearing 63 is provided in contact with the outer peripheral surface of the input shaft I and the inner peripheral surface of the inner axially protruding portion 32. The first bearing 61 is provided between the axially protruding portion 4 of the first support wall 3 and the inner axially protruding portion 32. In this example, the first bearing 61 is provided in contact with an outer peripheral surface 32*a* of the inner axially protruding portion 32 and an inner peripheral surface 4*b* of the axially protruding portion 4 of the first support wall 3. In this example, a ball bearing is used as such a first bearing 61. The first bearing 61 and the third bearing 63 are placed so as to overlap each other as viewed in the radial direction.

The second radially extending portion 41 is shaped to extend at least in the radial direction, and in the present embodiment, extends in the radial and circumferential directions. An axial through hole is formed in the radial center of the second radially extending portion 41, and the intermediate shaft M inserted through this through hole extends through the second radially extending portion 41, and is inserted into the rotor support member 30. In this example, the second radially extending portion 41 is formed to have a plate shape as a whole, and is shaped so that a radially inner portion of the second radially extending portion 41 is offset to the axial first direction A1 side with respect to a radially outer portion thereof. The second radially extending portion 41 is coupled to a cylindrical (boss-shaped) axially protruding portion 42 that protrudes toward the axial second direction A2 side. The axially protruding portion 42 is integrally coupled to the second radially extending portion 41 at a radially inner end of the second radially extending portion 41. The axially protruding portion 42 is formed so as to surround the intermediate shaft M. A part of the inner peripheral surface of the axially protruding portion 42 in the axial direction contacts the outer peripheral surface of the intermediate shaft M along the entire circumference. The second bearing 62 is provided between the axially protruding portion 42 and the axially protruding portion 9 of the second support wall 8. In this example, the second bearing 62 is provided in contact with the outer peripheral surface of the axially protruding portion 42 and the inner peripheral surface of the axially protruding portion 9 of the second support wall 8. In this example, a ball bearing is used as such a second bearing 62.

The axially protruding portion 42 is spline coupled, in the inner periphery of the end on the axial second direction A2 side, to the intermediate shaft M so as to rotate together with the intermediate shaft M. The axially protruding portion 42 is also spline coupled, in the outer periphery of the end on the axial second direction A2 side, to the inner rotor of the oil pump 18 so as to rotate together with the inner rotor. The hydraulic oil chamber H1 is formed between the second radially extending portion 41 and the piston 25.

In the present embodiment, the second radially extending portion 41 has a cylindrical protruding portion 43 that is formed in a cylindrical shape and protrudes toward the axial second direction A2 side. In this example, the cylindrical protruding portion 43 is shaped so as to have a certain thickness in the axial and radial directions. Such a cylindrical protruding portion 43 is formed in a radially outer region of the second radially extending portion 41. A radially outer portion of the cylindrical protruding portion 43 overlaps the rotor Ro as viewed in the axial direction. A radially inner portion of the cylindrical protruding portion 43 overlaps the clutch drum 22 as viewed in the axial direction. The cylindrical protruding portion 43 is placed so as to overlap the second bearing 62 and the second coil end portion Ce2 as viewed in the radial direction.

The axially extending portion 51 is shaped so as to extend at least in the axial direction, and in the present embodiment, extends in the axial and circumferential directions. The axially extending portion 51 has a cylindrical shape that surrounds the radially outer side of the clutch CL. The axially extending portion 51 couples the first radially extending portion 31 and the second radially extending portion 41 together in the axial direction at their radially outer ends. In this example, the axially extending portion 51 is formed integrally with the first radially extending portion 31 on the axial first direction A1 side. The axially extending portion 51 is coupled to the second radially extending portion 41 on the axial second direction A2 side by a fastening member such as a bolt. Note that the axially extending portion 51 may be coupled to the second radially extending portion 41 by welding, etc. The rotor Ro of the rotating electrical machine MG is fixed to the outer periphery of the axially extending portion 51.

In the present embodiment, the axially extending portion 51 has a cylindrical inner support portion 52 extending in the axial direction, and an annular one-side support portion 53 extending radially outward from an end of the inner support portion 52 on the axial second direction A2 side. In this example, the one-side support portion 53 is shaped so as to have a certain thickness in the axial and radial directions. The rotor Ro is fixed in contact with the outer peripheral surface of the inner support portion 52, whereby the inner support portion 52 supports the rotor Ro from radially inside. The rotor Ro is fixed in contact with an end face of the one-side support portion 53 on the axial first direction A1 side, whereby the one-side support portion 53 supports the rotor Ro from the axial second direction A2 side. Note that an annular rotor holding member 56 is inserted with the inner support portion 52 from the axial first direction A1 side of the rotor Ro. This rotor holding member 56 is placed so as to contact the rotor Ro from the axial first direction A1 side, and holds the rotor Ro from the axial first direction A1 side. In this example, the rotor holding portion 56 presses and holds the rotor Ro from the axial first direction A1 side, with the plurality of electromagnetic steel plates being held in the axial direction between the rotor holding portion 56 and the one-side support portion 53.

As described above, the rotor support member 30 of the present embodiment is structured so as to function also as the housing (the clutch housing) that accommodates the clutch CL. Most of the space formed inside the rotor support member 30 except the hydraulic oil chamber H1 serves as the circulating oil chamber H2 described above. In the present embodiment, the oil discharged from the oil pump 18 and adjusted to the predetermined oil pressure is supplied to the circulating oil chamber H2 through the circulating oil passage 48. In the present embodiment, the third bearing 63 provided between the inner axial protruding portion 32 of the first radially extending portion 31 and the input shaft I is a bearing having a sealing function (in this example, a needle bearing having a seal ring), which is structured so as to be able to ensure a certain level of fluid tightness. Moreover, a part of the axial length of the inner peripheral surface of the cylindrical portion 42 in the second radially extending portion 41 contacts the outer peripheral surface of the intermediate shaft M along the entire circumference. Thus, the circulating oil chamber H2 in the rotor support member 30 is made fluidtight, and the oil is supplied to the circulating oil chamber H2, whereby the circulating oil chamber H2 is basically filled with the oil having a predetermined pressure or more. Thus, in the hybrid drive device H of the present embodiment, the plurality of friction plates 24 provided in the clutch CL can be effectively cooled by a large amount of oil filling the circulating oil chamber H2. Note that most of the oil discharged from the circulating oil chamber H2 is discharged from the discharge oil passage 16 formed inside the intermediate shaft M, through a radial communication hole that opens in the outer peripheral surface of the input shaft I, and is returned to the oil pan (not shown).

In the present embodiment, a rotation sensor 11 is provided between the first support wall 3 and the first radially extending portion 31 on the axial first direction A1 side of the rotor support member 30. The rotation sensor 11 is a sensor for detecting the rotational position of the rotor Ro with respect to the stator St of the rotating electrical machine MG. For example, a resolver, etc. can be used as such a rotation sensor 11. In the present embodiment, the rotation sensor 11 is placed radially outside the first bearing 61 provided between the first support wall 3 and the first radially extending portion 31, so as to overlap the first bearing 61 as viewed in the radial direction. Moreover, the rotation sensor 11 is placed radially inside the rotor Ro so as to overlap the rotor Ro as viewed in the radial direction. Thus, the first bearing 61, the rotation sensor 11, and the rotor Ro are placed so as to overlap each other as viewed in the radial direction.

Moreover, in the present embodiment, the third bearing 63, in addition to the first bearing 61, the rotation sensor 11, and the rotor Ro, is also placed so as to overlap each other as viewed in the radial direction. Such a positional relation can reduce the axial length of the space occupied by these elements. Thus, the overall size of the hybrid drive device H can be reduced.

Moreover, in the present embodiment, as shown in FIGS. 2 and 3, a sensor rotor 12 is fixed to a side face of the first radially extending portion 31 on the axial first direction A1 side, and a sensor stator 13 is fixed to a side face of the first support wall 3 on the axial second direction A2 side. More specifically, at a position radially outside the first bearing 61, the sensor stator 13 is fixed to the axially protruding portion 4 as a sensor stator attachment portion formed so as to protrude from the side face of the first support wall 3 on the axial second direction A2 side. In this example, the sensor stator 13 is fixed so that its inner peripheral surface contacts an outer peripheral surface 4a of the axially protruding portion 4. At a position radially outside the sensor stator 13, the sensor rotor 12 is fixed to the outer axially protruding portion 34 as a sensor rotor attachment portion formed so as to protrude from the side face of the first radially extending portion 31 on the axial first direction A1 side. The sensor rotor 12 is fixed so that its outer peripheral surface contacts an inner peripheral surface 34b of the outer axially protruding portion 34.

Note that the sensor rotor 12 has a sensor rotor core that is formed as a stacked structure formed by stacking a plurality of annular disc-shaped electromagnetic steel plates, The sensor rotor core is held from the axial first direction A1 side by a sensor rotor holding member 14, and is fixed between the sensor rotor holding member 14 and the first radially extending portion 31. The sensor stator 13 includes a sensor stator core that is formed as a stacked structure formed by stacking a plurality of annular disc-shaped electromagnetic steel plates, and a coil that is wound around the sensor stator core. Note that those portions of the coil which protrude in the axial direction from the end faces of the sensor stator core located on both sides in the axial direction serve as coil end portions 13e. The sensor stator core is fixedly fastened to the first support wall 3 by a fastening member such as a bolt. The sensor stator 13 and the sensor rotor 12 are placed so as to face each other in the radial direction with a small gap therebetween.

1-3. Lubricating Structure for Bearings

A lubricating structure for the bearings according to the present embodiment will be described below with reference to FIGS. 2 and 3. In the present embodiment, the second bearing 62 is directly lubricated by a part of the oil from the oil pump 18 rather than via the hydraulic control device (not shown). That is, in the present embodiment, the part of the oil in the pump chamber accommodating the oil pump 18 leaks little by little in the axial direction through a small gap between the inner peripheral surface of the through hole in the second support wall 8 and the outer peripheral surface of the axially protruding portion 42 of the second radially extending portion 41, and lubricates the second bearing 62 placed on the axial first direction A1 side with respect to the small gap so as to be adjacent to the small gap. After lubricating the second bearing 62, the oil is supplied to the second coil end portion Ce2 placed radially outside the second bearing 62, etc. in order to cool the second coil end portion Ce2, etc.

On the other hand, the first bearing 61 and the third bearing 63 are lubricated by a part of the oil that is discharged from the fluid-tight circulating oil chamber H2 after being supplied to the circulating oil chamber H2 via the hydraulic control device (not shown). That is, in the present embodiment, a part of the oil discharged from the circulating oil chamber H2 lubricates the third bearing 63 provided between the outer peripheral surface of the input shaft I and the inner peripheral surface of the inner axially protruding portion 32, and leaks toward the axial first direction A1 side through the third bearing 63. The oil that has leaked through the third bearing 63 is blocked by the seal member 66 provided between the outer peripheral surface of the input shaft I and the inner peripheral surface of the through hole in the first support wall 3 at a position on the axial first direction A1 side of the third bearing 63, and flows radially outward to lubricate the first bearing 61 placed radially outside the third bearing 63. Thus, in the present embodiment, a lubricating oil supply passage LS is provided as a small gap between the rotor support member 30 (the inner axially protruding portion 32) and the input shaft I (more accurately, between each of the inner axially protruding portion 32 and the input shaft I and each portion that forms the third bearing 63. The oil from the lubricating oil supply passage LS is supplied to the first bearing 61 from radially inside and from the axial first direction A1 side. In the present embodiment, the lubricating oil supply passage LS corresponds to a "lubricant supply portion" in the present invention.

As described above, in the present embodiment, the part of the oil that is discharged from the fluid-tight circulating oil chamber H2 can be used to lubricate the third bearing 63 and also the first bearing 61 located radially outside the inner axially protruding portion 32. Thus, it is not necessary to provide the case 1 with a dedicated oil passage, etc. for lubricating the bearings 61, 63, whereby the bearings 61, 63 can be lubricated with a simple structure, and an increase in size of the hybrid drive device H can be suppressed.

Note that after lubricating the first bearing 61, the oil flows out from the axial second direction A2 side of the first bearing 61, and flows radially outward along the first radially extending portion 31 according to rotation of the rotor support member 30. This oil eventually falls onto the first coil end portion Ce1 positioned so as to overlap the first bearing 61 and the third bearing 63 as viewed in the radial direction, thereby cooling the first coil end portion Ce1.

In the present embodiment, as shown in FIG. 3, the sensor stator 13 is fixed to the side face of the first support wall 3 on the axial second direction A2 side, and the sensor rotor 12 is fixed to the side face of the first radially extending portion 31 on the axial first direction A1 side at a position radially outside the sensor stator 13. The first radially extending portion 31 that forms a part of the rotor support member 30 has a tilted portion 33 that is formed to be separated away from a side face of the sensor rotor 12 on the axial second direction A2 side to the axial second direction A2 side, in such manner to become separated toward the radially inner side at a fixed rate. In the present embodiment, the tilted portion 33 corresponds to a "separated portion" in the present invention. Such a tilted portion 33 is positioned between the inner axially protruding portion 32 and the outer axially protruding portion 34 in the radial direction so as to overlap the sensor rotor 12 as viewed in the axial direction. A radially outer end of the tilted portion 33 is in contact with the central portion of the side face of the sensor rotor 12 on the axial second direction A2 side. Thus, a radially inner end of the sensor rotor 12 is positioned so as to be separated from the first radially extending portion 31 to the axial first direction A1 side. In the first radially extending portion 31, a disc-shaped portion 36 that is located radially inside the tilted portion 33 is positioned so as to be slightly offset to the axial second direction A2 side with respect to a portion that is located radially outside the tilted portion 33. The coil end portion 13e of the sensor stator 13 is placed in a space formed by the offset of the disc-shaped portion 36 to the axial second direction A2 side. Thus, the rotation sensor 11 can be appropriately placed while ensuring performance and without being subjected to shape limitations.

Thus, in the case where the tilted portion 33 is provided in the first radially extending portion 31 in order to avoid shape limitations and to ensure the capability of the rotation sensor 11, a groove-shaped space is formed between a side face of the tilted portion 33 on the axial first direction A1 side and the side face of the sensor rotor 12 on the axial second direction A2 side. This space is a "second space V2" in the present invention. Such a second space V2 is a groove-shaped space that is continuous in the circumferential direction and that has a tilted V-shaped cross section. As described above, after lubricating the first bearing 61, the oil flows radially outward from the axial second direction A2 side of the first bearing 61 along the first radially extending portion 31 according to rotation of the rotor support member 30. The oil flowing along the first radially extending portion 31 eventually reaches the groove-shaped second space V2, and normally, would be accumulated in the second space V2. If the oil is accumulated in the second space V2, the accumulated oil can serve as drag resistance to rotation of the sensor rotor 12. This can reduce the overall energy efficiency of the hybrid drive device H.

Thus, the hybrid drive device H of the present embodiment has a communication oil passage LA that communicates the second space V2 with a first space V1 extending radially outward from the axial first direction A1 side of the sensor rotor 12 and formed between the first support wall 3 and the rotor support member 30. In the present embodiment, a plurality of such communication oil passages LA are provided, and the plurality of communication oil passages LA are arranged so as to be equally distributed in the circumferential direction. The first space V1 is a space that occupies, in the radial direction, a region between the radially inner end of the sensor rotor 12 and a radially outer end of the rotor Ro of the rotating electrical machine MG. That is, the first space V1 is a space that occupies, in the axial direction, a region between the first support wall 3 and the sensor rotor 12, that occupies, in the axial direction, a region between the first support wall 3 and a portion of the first radially extending portion 31 which is located radially outside the outer axially protruding portion 34, or that occupies, in the axial direction, a region between the first support wall 3 and the rotor Ro of the rotating electrical machine MG. The range occupied by the first space V1 is schematically shown by a broken line in FIG. 3. The communication oil passages LA are provided in at least one of the rotor support member 30 and the sensor rotor 12. The present embodiment uses a structure that avoids processing of the sensor rotor 12 in order to maintain high detection accuracy of the rotation sensor 11, and the entire communication oil passages LA are formed inside the rotor support member 30 (in this example, the first radially extending portion 31). In the present embodiment, the communication oil passages LA corresponds to a "communication passage" in the present invention.

The hybrid drive device H of the present embodiment is provided with such communication oil passages LA. Thus, even if the oil supplied from the lubricating oil supply passage LS flows radially outward along the first radially extending portion 31 and reaches the groove-shaped second space V2 after lubricating the first bearing 61, the oil that has reached the second space V2 is smoothly discharged into the first space V1 through the communication oil passages LA. This obstructs accumulation of the oil in the gap between the side face of the tilted portion 33 of the first radially extending portion 31 on the axial first direction A1 side and the side face of the sensor rotor 12 on the axial second direction A2 side, and thus can reduce drag loss of the sensor rotor 12 due to the accumulated oil. Thus, reduction in overall energy efficiency of the hybrid drive device H can be suppressed. Note that as described above, the sensor stator 13 and the sensor rotor 12 are positioned so as to face each other in the radial direction with a small gap therebetween. However, the oil that has reached the second space V2 is smoothly discharged into the first space V1 through the communication oil passages LA rather than through the small gap.

In the present embodiment, such communication oil passages LA are formed so as to extend at least in the radial and axial directions inside the first radially extending portion 31. In the present embodiment, the communication oil passages LA are formed in a radial pattern without being tilted in the circumferential direction as viewed in the axial direction. More specifically, each communication oil passage LA extends radially outward along the radial direction from an opening P2 on the second space V2 side (hereinafter referred to as the "second opening P2"), is bent at an obtuse angle at a position radially outside the inner peripheral surface 34b of the outer axially protruding portion 34, and extends so as to be tilted to the axial first direction A1 side toward the radially outer side, thereby opening at an opening P1 on the first space V side (hereinafter referred to as the "first opening P1").

The second opening P2 is formed in the radially outer end of the tilted portion 33 at a position including a contact portion 33a that contacts the sensor rotor 12. Thus, each communication oil passage LA is formed to open at the position of the contact portion 33a in the second space V2. In other words, a part of the opening of each communication oil passage LA to the second space V2 side is formed by a part of the side face of the tilted portion 33 on the axial first direction A1 side that is to contact the sensor rotor 12. The communication oil passages LA open in the radial direction to the second space V2. That is, the direction in which each communication oil passage LA extends at the position of the second opening P2 is a direction parallel to the radial direction. In the present embodiment, as described above, the third bearing 63 is a bearing having a sealing function, which ensures a certain level of fluid tightness. Thus, the flow rate of the oil that is supplied from the lubricating oil supply passage LS is such that at least the first bearing 61 can be appropriately lubricated. Accordingly, the maximum amount of oil that is supplied from the lubricating oil supply passage LS to the second space V2 is smaller than the maximum amount of oil that is discharged from the communication oil passages LA. Thus, by using the structure in which the communication oil passages LA open at the radially outer end of the second space V2 as in the present embodiment, almost all of the oil that reaches the second space V2 can be smoothly discharged to the first space V1 through the communication oil passages LA by a centrifugal force associated with rotation of the rotor support member 30. Accordingly, drag loss of the sensor rotor 12 can be effectively reduced.

In the present embodiment, the first opening P1 is positioned radially inside the first coil end portion Ce1 of the stator St so as to overlap the first coil end portion Ce1 as viewed in the radial direction. More specifically, the first opening P1 is formed so as to open at an axial position near the end face of the stator core on the axial first direction A1 side, in a region that is occupied by the first coil end portion Ce1 in the axial direction. The first opening P1 is formed at a position radially outside the outer peripheral surface of the outer axially protruding portion 34, in the side face of the first radially extending portion 31 of the rotor support member 30 on the axial first direction A1 side, and the communication oil passages LA are formed so as to open in the side face of the first radially extending portion 31 on the axial first direction A1 side in the first space V1. Each communication oil passage LA opens toward a direction tilted in the radial and axial directions in the first space V1. That is, the direction in which each communication oil passage LA extends at the position of the first opening P1 is the direction tilted in the radial and axial directions (specifically, the direction tilted to the axial first direction A1 side toward the radially outer side). Thus, the oil that is discharged from the first opening P1 on the first space V1 side through each communication oil passage LA by a centrifugal force associated with rotation of the rotor support member 30 can be ejected along the direction in which each communication oil passage LA extends, and eventually appropriately guided to the first coil end portion Ce1. Thus, the first coil end portion Ce1 can also be cooled by using the oil that has lubricated the first bearing 61.

2. Second Embodiment

Figure 4:
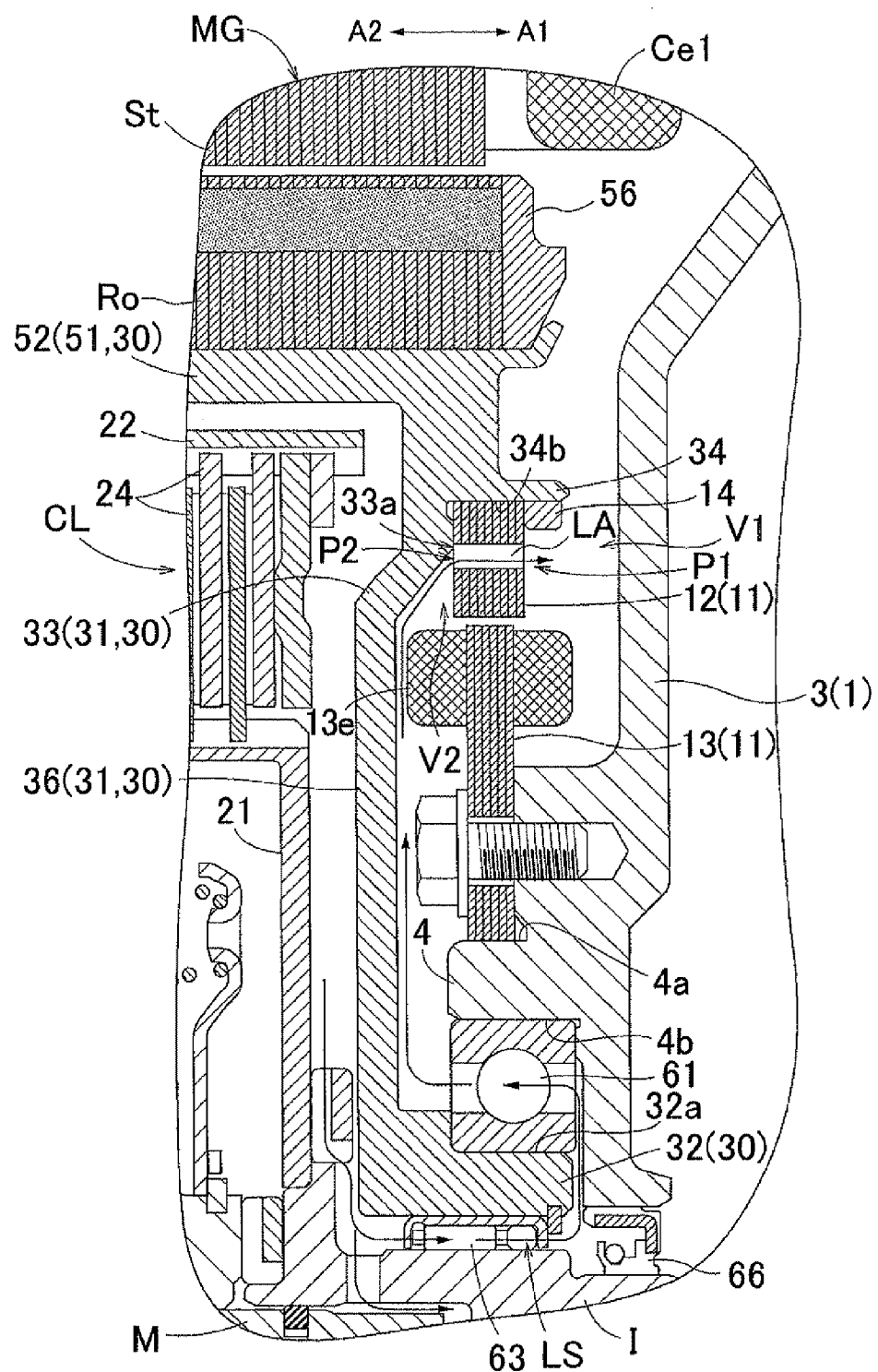
FIG. 4 is a cross-sectional view of a main portion of a hybrid drive device according to a second embodiment.

A second embodiment of the present invention will be described below with reference to FIG. 4. The present embodiment is also described with respect to an example in which the vehicle drive device of the present invention is applied to a hybrid drive device H. The overall structure of the hybrid drive device H and the structure of each portion of the hybrid drive device H according to the present embodiment are basically similar to those of the first embodiment. However, the present embodiment is different from the first embodiment in the structure of the communication oil passages LA. The structure of the communication oil passages LA, which different from the first embodiment, will be described below. Note that the present embodiment is similar to the first embodiment in those respects which are not specifically mentioned below.

The communication oil passages LA are oil passages provided in at least one of the rotor support member 30 and the sensor rotor 12, and communicating the second space V2 with the first space V1. In the present embodiment, the entire communication oil passages LA are formed inside the sensor rotor 12 (the sensor rotor core). The communication oil passages LA are formed so as to extend at least in the axial direction inside the sensor rotor 12. In the present embodiment, the communication oil passages LA extend through the sensor rotor 12 along the axial direction. Using such a structure of the communication oil passages LA is advantageous in that the communication oil passages LA can be easily formed by merely extending the communication oil passages LA through the sensor rotor 12 along the axial direction. Note that such communication oil passages LA can be formed by forming a hole in each of the electromagnetic steel plates that form the sensor rotor core, and fixing the holes with the holes being successively aligned in the axial direction. The holes can be simultaneously formed in a punching process of the electromagnetic steel plates that form the sensor rotor core. In the present embodiment, the communication oil passages LA correspond to a "communication passage" in the present invention.

As described above, the communication oil passages LA are formed so as to extend through the sensor rotor 12 along the axial direction. Thus, the communication oil passages LA open in the axial direction in both the first space V1 and the second space V2. That is, both the directions in which each communication oil passage LA extends at the positions of the first opening P1 and the second opening P2 are a direction parallel to the axial direction. At this time, the second opening P2 is formed at the radially outer end of the tilted portion 33 at a position including the contact portion 33a that contacts the sensor rotor 12. Thus, each communication oil passage LA is formed so as to open at the position of the contact portion 33a in the second space V2. In other words, a part of the opening of each communication oil passage LA to the second space V2 side is formed by a part of the side face of the sensor rotor 12 on the axial second direction A2 side that is to contact the tilted portion 33. Thus, in the present embodiment as well, almost all of the oil that has lubricated the first bearing 61 can be smoothly discharged to the first space V1 through the communication oil passages LA without being accumulated in the second space V2. Thus, in the present embodiment as well, drag loss of the sensor rotor 12 can be effectively reduced, and reduction in overall energy efficiency of the hybrid drive device H can be suppressed.

In the present embodiment, the first opening P1 opens in the side face of the sensor rotor 12 on the axial first direction A1 side in the first space V1. The first opening P1 is positioned radially inside the first coil end portion Ce1 of the stator St so as to overlap the first coil end portion Ce1 as viewed in the radial direction. Thus, in the present embodiment as well, the oil that is discharged from the first opening P1 on the first space V1 side through each communication oil passage LA by a centrifugal force associated with rotation of the rotor support member 30 can be eventually appropriately guided to the first coil end portion Ce1. Thus, the first coil end portion Ce1 can also be cooled by using the oil that has lubricated the first bearing 61. Note that in this case, a tilted groove portion that is tilted radially outward toward the axial first direction A1 side may be formed in the inner peripheral surface of the sensor rotor holding member 14. In this case, it can be expected that the oil that is discharged from the first opening P1 can be more smoothly guided to the first coil end portion Ce1.

3. Third Embodiment

A third embodiment of the present invention will be described below with reference to FIGS. 5 and 6. The present embodiment is also described with respect to an example in which the vehicle drive device of the present invention is applied to a hybrid drive device H. The overall structure of the hybrid drive device H and the structure of each portion of the hybrid drive device H according to the present embodiment are basically similar to those of the first embodiment. However, the present embodiment is different from the first embodiment in the structure of the communication oil passages LA. The structure of the communication oil passages LA, which is different from the first embodiment, will be described below. Note that the present embodiment is similar to the first embodiment in those respects which are not specifically mentioned below.

3-1. Cooling Structure for Rotating Electrical Machine

First, a cooling structure for the rotating electrical machine MG will be described before the structure of the communication oil passages LA. The rotating electrical machine MG of the present embodiment basically has a structure in which the coil end portions Ce1, Ce2 are cooled by the oil that is supplied from the axial second direction A2 side of the rotor Ro.

Figure 5:
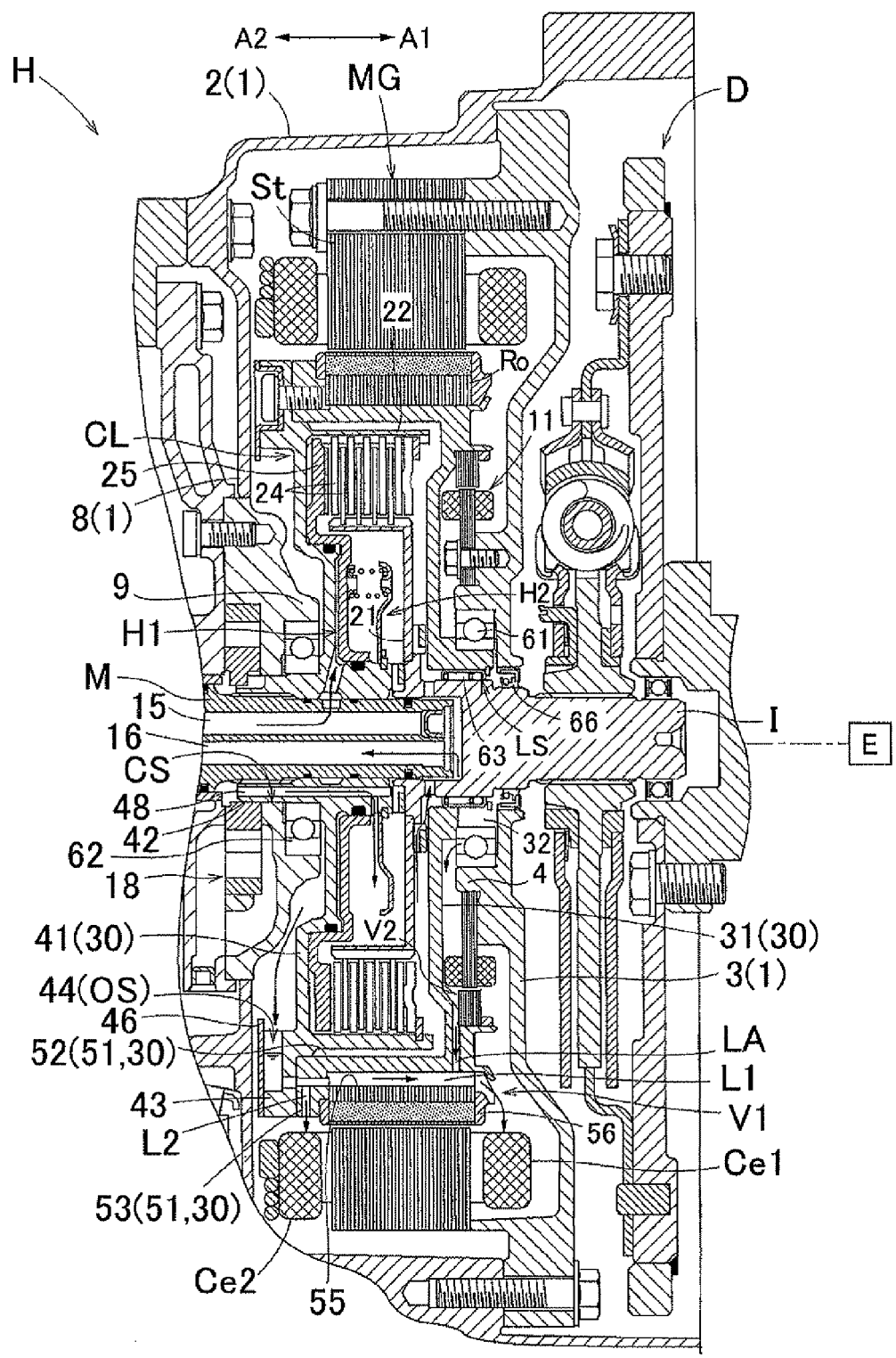
FIG. 5 is a partial cross-sectional view of a hybrid drive device according to a third embodiment.
Figure 6:
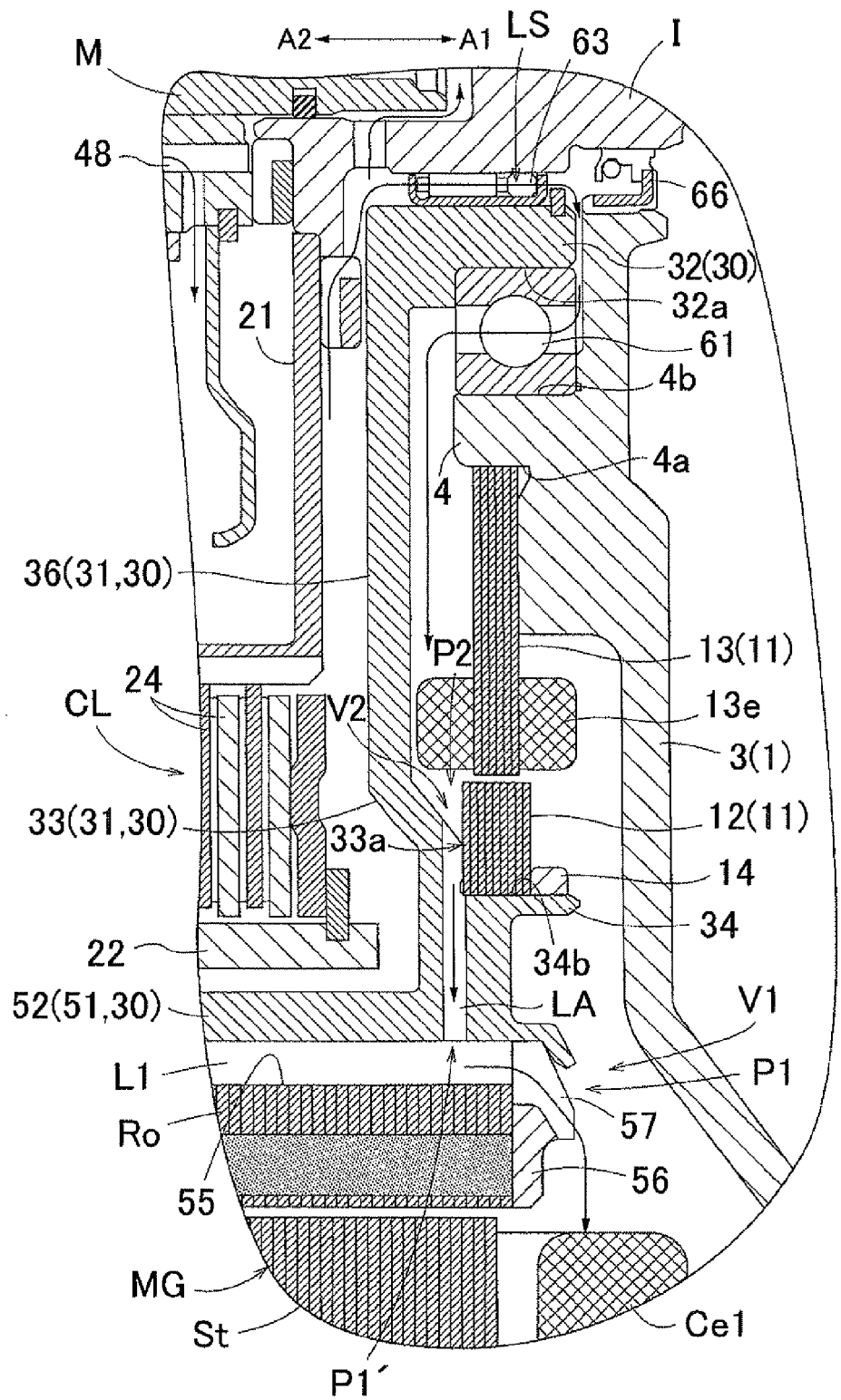
FIG. 6 is a cross-sectional view of a main portion of the hybrid drive device according to the third embodiment.

As shown in FIG. 5, in the present embodiment, the second support wall 8 placed on the axial second direction A2 side with respect to the rotor Ro is provided with a cooling oil supply portion CS for supplying oil to the rotating electrical machine MG. More specifically, the cooling oil supply portion CS of the present embodiment is provided as a small gap between the inner peripheral surface of the through hole in the second support wall 8 and the outer peripheral surface of the axially protruding portion 42 of the second radially extending portion 41, on the axial first direction A1 side of the oil pump 18 placed inside the second support wall 8. A part of the oil in the pump chamber accommodating the oil pump 18 leaks little by little in the axial direction through the small gap as the cooling oil supply portion CS, and first lubricates the second bearing 62 as in the first embodiment. After lubricating the second bearing 62, the oil flows downward in the vertical direction (to the lower side in FIG. 5) along the second radially extending portion 41, and is eventually supplied to the coil end portions Ce1, Ce2 of the rotating electrical machine MG located radially outside the rotor support member 30.

Oil collecting portions OC are provided radially outside the small gap as the cooling oil supply portion CS. In the present embodiment, such oil collecting portions OC are provided at an end of the cylindrical protruding portion 43 of the second radially extending portion 41 on the axial second direction A2 side that forms a part of the rotor support member 30. More specifically, the cylindrically protruding portion 43 is provided with recesses 44, which are shaped to be recessed to the axial first direction A1 side with respect to an end face of the cylindrically protruding portion 43 on the axial second direction A2 side, and which open to the inner side in the radial direction. A cover member 46 is fixed in contact with the end face of the cylindrically protruding portion 43 on the axial second direction A2 side. The oil collecting portions OC are formed as pocket-shaped spaces defined between the recesses 44 and the cover member 46. Such oil collecting portions OC are arranged so as to be evenly distributed at a plurality of circumferential positions. Each oil collecting portion OC is closed on both sides in the axial direction, on both sides in the circumferential direction, and on the outer side in the radial direction, and opens only to the inner side in the radial direction. The oil collecting portions OC are capable of efficiently collecting and storing the oil that is supplied from the cooling oil supply portion CS and flows downward in the vertical direction along the second radially extending portion 41.

The rotating electrical machine MG of the present embodiment is structured to cool the coil end portions Ce1, Ce2 by using the oil collected and stored by the oil collecting portions OC. Thus, the rotating electrical machine MG of the present embodiment has two oil passages (a first oil passage Li and a second oil passage L2), which are provided in both the rotor Ro and the rotor support member 30 and which are formed to open at positions radially inside the coil end portions Ce1, Ce2. The first oil passage L1 extends from the oil collecting portions OC, and opens at a position radially inside the first coil end portion Ce1. The second oil passage L2 extends from the oil collecting portions OC, and opens at a position radially inside the second coil end portion Ce2. The first oil passage L1 and the second oil passage L2 are formed to share a portion on the upstream side (on the oil collecting portions OC side), In the present embodiment, the first oil passage L1 has a portion extending along the axial direction in (inside) the one-side support portion 53 of the axially extending portion 51, and a portion extending in the axial direction along the joint surface between the inner peripheral surface of the rotor Ro and the outer peripheral surface of the inner support portion 52. In this example, the portion extending in the axial direction along the joint surface between the inner peripheral surface of the rotor Ro and the outer peripheral surface of the inner support portion 52 is formed as a space between the outer peripheral surface of the inner support portion 52 and an axial groove portion 55 formed radially inside the rotor Ro. The second oil passage L2 is formed so as to branch from the first oil passage L1 and extend radially outward in the one-side support portion 53.

In the rotating electrical machine MG having such a structure as described above, the coil end portions Ce1, Ce2 are cooled as follows. First, the oil, which is supplied from the cooling oil supply portion CS provided on the axial second direction A2 side with respect to the rotor Ro, is collected by the oil collecting portions OC. The oil collected by the oil collecting portions OC is supplied from the oil collecting portions OC to the first oil passage L11. A part of the oil supplied to the first oil passage L1 is ejected from the opening on the axial first direction A1 side, and falls onto the first coil end portion Ce1 placed radially outside the opening, thereby cooling the first coil end portion Ce1. Another part of the oil supplied to the first oil passage L1 is ejected from the opening on the axial second direction A2 side through the second oil passage L2 branching from the first oil passage L1, and falls onto the second coil end portion Ce2 placed radially outside the opening, thereby cooling the second coil end portion Ce2. The rotating electrical machine MG of the present embodiment is capable of efficiently collecting the oil from the cooling oil supply portion CS provided on the axial second direction A2 side by the oil collecting portions OC, and cooling not only the second coil end portion Ce2 on the axial second direction A2 side but also the first coil end portion Ce1 on the axial first direction A1 side via the first oil passage L1 and the second oil passage L2. Note that after cooling the coil end portions Ce1, Ce2, the oil is returned to the oil pan (not shown).

3-2. Structure of Communication Oil Passages

The communication oil passages LA are oil passages that are provided in at least one of the rotor support member 30 and the sensor rotor 12, and communicate the second space V2 with the first space V1. Like the first embodiment, the present embodiment also uses the structure that allows avoiding processing of the sensor rotor 12 in order to maintain high detection accuracy of the rotation sensor 11, and the entire communication oil passages LA are formed inside the rotor support member 30 (in this example, the first radially extending portion 31). In the present embodiment, the communication oil passages LA correspond to the "communication passage" in the present invention.

The present embodiment is similar to the first embodiment in that each communication oil passage LA is formed so as to extend at least in the radial direction inside the first radially extending portion 31, in that each communication oil passage LA is formed so as to open at the position of the contact portion 33a in the second space V2, and in that an extending direction of each communication oil passage LA at the position of the second opening P2 is oriented in a direction parallel to the radial direction. Thus, in the present embodiment as well, almost all of the oil that has lubricated the first bearing 61 can be smoothly discharged to the first space V1 through the communication oil passages LA without being accumulated in the second space V2. Thus, in the present embodiment as well, drag loss of the sensor rotor 12 can be effectively reduced, and reduction in overall energy efficiency of the hybrid drive device H can be suppressed.

On the other hand, in the present embodiment, the communication oil passages LA are formed so as to communicate with the first space V1 by using a part of the first oil passage Li for cooling the rotating electrical machine MG described above. That is, the communication oil passages LA of the present embodiment are formed so as to extend along the radial direction inside the first radially extending portion 31, and to communicate with the first oil passage L1 formed between the rotor Ro and the inner support portion 52. The first oil passage L1 opens in the side face of the rotor Ro on the axial first direction A1 side. Thus, the communication oil passages LA are formed so as to extend along the radial direction inside the first radially extending portion 31, communicate with the axial groove portion 55 formed so as to extend in the axial direction along the joint surface between the inner peripheral surface of the rotor Ro and the outer peripheral surface of the inner support portion 52, and open to the first space V1 in the side face of the rotor Ro on the axial first direction A1 side via the axial groove portion 55.

In the present embodiment, the communication oil passages LA are formed so as to open to the first space V1 by using a part of the first oil passage L1, on the assumption that the oil passages L1, L2 for cooling the rotating electrical machine MG are provided. Thus, processing required for forming the communication oil passages LA is substantially only a process of punching the rotor support member 30 (the first radially extending portion 31) along the radial direction. Note that processing for forming the first oil passage L1 (the axial groove portion 55) can also be performed in a relatively simple manner by, e.g., forming a cutout in radially inner portions of the electromagnetic steel plates that form the rotor Ro, when punching the electromagnetic steel plates. Thus, the present embodiment is advantageous in that the entire communication oil passages LA and the entire first oil passage L1 can be easily formed by relatively simple processing.

Note that in the present embodiment, a portion where each communication oil passage LA extending along the radial direction in the first radially extending portion 31 opens to the axial groove portion 55 serves as an opening P1' on the first space V1 side, which is formed in the rotor support member 30. The first oil passage L1 formed radially outside the opening P1' on the first space V1 side in the rotor support member 30 opens in the side face of the rotor Ro (the rotor holding member 56) on the axial first direction A1 side. Thus, the first opening P1 on the first space V1 side in the present embodiment is formed in the side face of the rotor Ro (the rotor holding member 56) on the axial first direction A1 side. A plurality of through holes 57 extending through the rotor holding member 56 at least in the axial direction are formed in the rotor holding member 56 at circumferential positions corresponding to the first oil passage L1. The through holes 57 are tilted radially outward toward the axial first direction A1 side. The through holes 57 having such a shape serve to guide the oil, supplied from the first oil passage L1, to the first coil end portion Ce1. That is, the first oil passage L1 (including the through holes 57 in the rotor holding member 56 in this example) formed radially outside the opening on the first space V1 side in the rotor support member 30 functions as a "guide portion" that guides the oil from each communication oil passage LA to the first coil end portion Ce1. Since the present embodiment includes such a guide portion, the first coil end portion Ce1 can be more efficiently cooled.

4. Other Embodiments

Lastly, other embodiments of the vehicle drive device of the present invention will be described below. Note that a characteristic structure disclosed in each of the following embodiments is not applied only in that embodiment, but may be applied in combination with the characteristic structures disclosed in the other embodiments as long as no inconsistency arises.

(1) The above embodiments are described with respect to examples in which the first radially extending portion 31 has the tilted portion 33, which is tilted at a fixed rate, as the separated portion. However, embodiments of the present invention are not limited to these examples. That is, the above separated portion may be formed so as to be separated at least from the side face of the sensor rotor 12 on the axial second direction A2 side to the axial second direction A2 side, in such a manner to become more separated toward the radially inner side. For example, the first radially extending portion 31 may be structured to have, as the separated portion, a stepped portion having at least one step, which is formed so as to be separated stepwise.

(2) The above embodiments are described with respect to examples in which each communication oil passage LA is formed so as to open at the position of the contact portion 33a in the second space V2. However, embodiments of the present invention are not limited to these examples. That is, each communication oil passage LA may be formed so as to open at least at any position in the second space V2. This can reduce at least drag loss of the sensor rotor 12 due to the oil accumulated in the second space V2.

(3) The first and third embodiments are described with respect to examples in which the communication oil passages LA open in a direction parallel to the radial direction in the second space V2, and the second embodiment is described with respect to an example in which the communication oil passages LA open in a direction parallel to the axial direction in the second space V2. However, embodiments of the present invention are not limited to these examples. That is, for example, the communication oil passages LA may be structured to open in a direction tilted in the radial and axial directions in the second space V2. The communication oil passages LA may be structured to open in a direction also tilted in the circumferential direction, in both cases where the communication oil passages LA open in the direction parallel to the radial or axial direction, and where the communication oil passages LA open in the direction tilted in the radial and axial directions.

(4) The first embodiment is described with respect to an example in which each communication oil passage LA extends radially outward from the second opening P2 along the radial direction, and is bent at an obtuse angle at a predetermined position, is tilted to the axial first direction A1 side toward the radially outer side, and opens to the first opening P1. However, embodiments of the present invention are not limited to this. That is, for example, each communication oil passage LA may be formed so as to extend radially outward from the second opening P2 along the radial direction, may be bent at right angles at a predetermined position, may extend along the axial direction, and may open to the first opening P1. For example, each communication oil passage LA may be formed so as to tilt from the second opening P2 to the axial first direction A1 side toward the radially outer side, and open to the first opening P1. In addition, in the case where the communication oil passages LA are formed so as to extend inside the first radially extending portion 31 at least in the radial and axial directions, the mode of formation thereof can be arbitrarily set.

(5) The second embodiment is described with respect to an example in which the communication oil passages LA are formed so as to extend through the sensor rotor 12 along the axial direction. However, embodiments of the present invention are not limited to this. That is, for example, each communication oil passage LA may be formed so as to tilt radially outward toward the axial first direction A1 side, and open to the first opening P1. In addition, in the case where the communication oil passages LA are formed so as to extend through the sensor rotor 12 in the axial direction, the mode of formation thereof can be arbitrarily set.

(6) The third embodiment is described with respect to an example in which each communication oil passage LA is formed so as to extend radially outward from the second opening P2 along the radial direction to communicate with the first oil passage L1. However, embodiments of the present invention are not limited to this. That is, for example, each communication oil passage LA may be formed so as to extend in a direction tilted with respect to the radial direction to communicate with the first oil passage L1. Alternatively, for example, each communication oil passage LA may be formed so as to extend radially outward from the second opening P2 along the radial direction, be bent at a predetermined position to extend in a direction tilted with respect to the radial direction, and communicates with the first oil passage L1. In addition, in the case where the communication oil passages LA are formed so as to extend inside the first radially extending portion 31 at least in the radial direction, the mode of formation thereof can be arbitrarily set.

(7) The third embodiment is described with respect to an example in which the first oil passage L1 with which each communication oil passage LA communicates is formed as a space between the outer peripheral surface of the inner support portion 52 and the axial groove portion 55 formed radially inside the rotor Ro. However, embodiments of the present invention are not limited to this. That is, for example, such a first oil passage L1 may be formed as a space between an axial groove portion formed radially outside the inner support portion 52 and the inner peripheral surface of the rotor Ro, or a space between the axial groove portion formed radially outside the inner support portion 52 and the axial groove portion formed radially inside the rotor Ro. Alternatively, for example, such a first oil passage L1 may be formed as an axial hole formed inside the rotor Ro.

(8) The above embodiments are described with respect to examples in which the hybrid drive device H includes one type of the communication oil passages LA. However, embodiments of the present invention are not limited to these examples. That is, for example, the hybrid drive device H may include a plurality of types of the communication oil passages LA, such as including a combination of the communication oil passages LA of the first or third embodiment and the communication oil passages LA of the second embodiment, or including a combination of all the communication oil passages LA of the above embodiments.

(9) Of the above embodiments, the cooling structure for the rotating electrical machine MG including the oil collecting portions OC, the first oil passage L1, and the second oil passage L2 is mentioned only in the third embodiment. However, it should be understood that such a cooling structure for the rotating electrical machine MG can be provided in the first and second embodiments (see FIG. 2).

(10) The above embodiments are described with respect to examples in which the rotation sensor 11 is positioned radially inside the rotor Ro so as to overlap the rotor Ro as viewed in the radial direction. However, embodiments of the present invention are not limited to these examples. That is, the rotation sensor 11 may be positioned at a different axial position from the rotor Ro so as not to overlap the rotor Ro as viewed in the radial direction.

(11) The above embodiments are described with respect to examples in which the first opening P1 is positioned radially inside the first coil end portion Ce1 of the stator St so as to overlap the first coil end portion Ce1 as viewed in the radial direction. However, embodiments of the present invention are not limited to these examples. That is, the first opening P1 may be positioned at a different axial position from the first coil end portion Ce1 so as not to overlap the first coil end portion Ce1 as viewed in the radial direction. In this case, in order to efficiently cool the first coil end portion Ce1, a guide portion that guides the oil from each communication oil passage LA to the first coil end portion Ce1 may be provided radially outside the opening P1' on the first space V1 side that is formed in the rotor support member 30 or the sensor rotor 12, like the first oil passage L1 in the third embodiment.

(12) The above embodiments are described with respect to examples in which the sensor stator 13 of the rotation sensor 11 is fixed in contact with the outer peripheral surface 4a of the axially protruding portion 4 of the first support wall 3. However, embodiments of the present invention are not limited to these examples. That is, for example, the sensor stator 13 may be fixed only in contact with the side face of the first support wall 3 on the axial second direction A2 side, and not in contact with the outer peripheral surface 4a of the axially protruding portion 4. Alternatively, for example, the sensor stator 13 may be fixed to the side face of the first support wall 3 on the axial second direction A2 side via other member such as a sensor stator attachment member.

(13) The above embodiments are described with respect to examples in which the lubricating oil supply passage LS as the lubricant supply portion is formed as the small gap between at least one of the inner axially protruding portion 32 and the input shaft 1, and the third bearing 63. However, embodiments of the present invention are not limited to these examples. That is, in the present invention, at least the oil need only be supplied from radially inside the first bearing 61, and for example, a dedicated oil passage for supplying the oil discharged from the oil pump 18 may be provided in the first support wall 3, and the lubricant supply portion may be formed by the dedicated oil passage.

(14) The above embodiments are described with respect to examples in which the hybrid drive device H has a multi-axis structure suitable for being mounted on front-engine, front-wheel drive (FF) vehicles. However, embodiments of the present invention are not limited to these examples. That is, the hybrid drive device H may have a uniaxial structure in which the output shaft of the speed change mechanism TM is coaxially arranged with the input shaft 1 and the intermediate shaft M, and is directly drivingly coupled to the output differential gear unit DF. The hybrid drive device H having such a structure is also suitable for being mounted on front-engine, rear-wheel drive (FR) vehicles.

(15) The above embodiments are described with respect to examples in which the vehicle drive device of the present invention is applied to the hybrid drive device H for hybrid vehicles including both the internal combustion engine E and the rotating electrical machine MG as the driving force source of the vehicle. However, embodiments of the present invention are not limited to these examples. That is, the present invention may also be applied to a drive device for electric cars (electric vehicles) including only the rotating electrical machine MG as the driving force source of the vehicle.

(16) Regarding other structures as well, the embodiments disclosed in the specification are by way of example only in all respects, and embodiments of the present invention are not limited to them. That is, it is to be understood that the configurations in which the structures that are not described in the claims are partially modified as appropriate also fall within the technical scope of the present invention, as long as the configurations include the structures described in the claims of the present application and the structures equivalent thereto.

The present invention can be used in a vehicle drive device provided with a rotating electrical machine accommodated in a case with the rotating electrical machine having a rotor and a stator and functioning as a driving force source of a vehicle.

What is claimed is:

1. A vehicle drive device, comprising:
    a case with a support wall;
        a rotating electrical machine that is accommodated in the case, the rotating electrical machine having a rotor and a stator;
        a rotor support member that rotatably supports the rotor placed radially inside the stator;
        a bearing that is placed between the support wall and the rotor support member;
        a lubricant supply portion that supplies a lubricant to the bearing from radially inside;
        a rotation sensor having a sensor stator that is fixed to the support wall radially outside the bearing, and a sensor rotor that is placed radially outside the sensor stator and is fixed to a sensor rotor attachment portion formed so as to protrude from a side face of the rotor support member on an axial first direction side, which is one side in an axial direction of the rotating electrical machine; and
        a communication passage that is provided in the rotor support member radially outside of the sensor rotor, and communicates a first space, which extends radially outward from the axial first direction side of the sensor rotor and is formed between the support wall and the rotor support member, with a second space, which is formed between the sensor rotor and the rotor support member, wherein
    the support wall extends at least in a radial direction to the axial first direction side,
    after lubricating the bearing, the lubricant is discharged from the second space to the first space through the communication passage,
    the rotor support member has a cylindrical inner support portion that supports the rotor from radially inside, an axial groove portion is formed which extends in the axial direction along a joint surface between an inner peripheral surface of the rotor and an outer peripheral surface of the inner support portion, and opens to a side face of the rotor on the axial first direction side, and the communication passage is formed so as to extend inside the rotor support member at least in the radial direction to communicate with the axial groove portion and so as to open to the first space in the side face of the rotor on the axial first direction side via the axial groove portion.

2. The vehicle drive device according to claim 1, wherein the rotor support member has a separated portion formed so as to be separated from a side face of the sensor rotor on an axial second direction side, which is the other side in the axial direction of the rotation electrical machine, to the axial second direction side, in such a manner to become more separated toward a radially inner side, and the communication passage is formed so as to open to the second space formed in a groove shape between a side face of the separated portion on the axial first direction side and the side face of the sensor rotor on the axial second direction side.

3. The vehicle drive device according to claim 2, wherein the communication passage opens in the radial direction or in the axial direction in the second space.

4. The vehicle drive device according to claim 2, wherein a part of the opening of the communication passage to the second space is formed by a part of the side face of the separated portion on the axial first direction side which contacts the sensor rotor, or by a part of the side face of the sensor rotor on the axial second direction side which contacts the separated portion.

5. The vehicle drive device according to claim 4, wherein the communication passage opens in the radial direction or in the axial direction in the second space.

6. The vehicle drive device according to claim 1, wherein the communication passage opens in the radial direction or in the axial direction in the second space.

7. The vehicle drive device according to claim 1, wherein the communication passage is formed to extend at least in the radial direction and the axial direction inside the rotor support portion, and open to the first space in the side face of the rotor support member on the axial first direction side.

8. The vehicle drive device according to claim 1, wherein the rotation sensor is positioned radially inside the rotor so as to overlap the rotor as viewed in the radial direction, and an opening on the first space side is positioned radially inside a coil end portion of the stator so as to overlap the coil end portion as viewed in the radial direction.

9. The vehicle drive device according to claim 8, wherein a guide portion that guides the lubricant from the communication passage to the coil end portion of the stator is provided in a portion radially outside an opening on the first space side that is formed in the rotor support member or the sensor rotor.

10. The vehicle drive device according to claim 1, wherein a guide portion that guides the lubricant from the communication passage to the coil end portion of the stator is provided in a portion radially outside an opening on the first space side that is formed in the rotor support member or the sensor rotor.

11. The vehicle drive device according to claim 1, further comprising:

a first axially protruding portion that protrudes from the support wall to the axial second direction side, which is the other side in the axial direction of the rotating electrical machine;

a radially extending portion that forms a part of the rotor support member and extends at least in the radial direction;

a second axially protruding portion that protrudes from the radially extending portion to the axial first direction side; and a third axially protruding portion that is positioned radially outside the second axially protruding portion and protrudes from the radially extending portion to the axial first direction side portion, wherein the bearing is placed in contact with an inner peripheral surface of the first axially protruding portion and an outer peripheral surface of the second axially protruding portion, and the sensor stator is placed in contact with an outer peripheral surface of the first axially protruding portion, and the sensor rotor is placed in contact with an inner peripheral surface of the third axially protruding portion.

12. The vehicle drive device according to claim 1, further comprising:

a shaft member that extends, from the axial first direction side, through the support wall and the rotor support member radially inside thereof so that the shaft member is inserted into the rotor support member; and a friction engagement device that is positioned radially inside the rotor, wherein a housing that surrounds the friction engagement device is formed by using at least a part of the rotor support member, and the friction engagement device is placed inside the housing in a fluid-tight state, the housing is filled with the lubricant, and the lubricant that flows and leaks from between the rotor support member and the shaft member is supplied to the bearing as the lubricant from the lubricant supply portion.

* * * * *